US010588042B2

(12) United States Patent
Nagaraja et al.

(10) Patent No.: US 10,588,042 B2
(45) Date of Patent: Mar. 10, 2020

(54) TRANSMISSION OPPORTUNITIES DURING MEASUREMENT GAPS

(71) Applicant: QUALCOMM Incorporated, San Diego, CA (US)

(72) Inventors: Sumeeth Nagaraja, San Diego, CA (US); Arvind Vardarajan Santhanam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/007,732

(22) Filed: Jun. 13, 2018

(65) Prior Publication Data

US 2019/0021017 A1   Jan. 17, 2019

Related U.S. Application Data

(60) Provisional application No. 62/531,277, filed on Jul. 11, 2017.

(51) Int. Cl.
*H04W 24/10* (2009.01)
*H04W 72/04* (2009.01)
*H04W 72/10* (2009.01)

(52) U.S. Cl.
CPC ......... *H04W 24/10* (2013.01); *H04W 72/042* (2013.01); *H04W 72/048* (2013.01); *H04W 72/10* (2013.01)

(58) Field of Classification Search
CPC . H04W 24/10; H04W 72/042; H04W 72/048; H04W 72/10
See application file for complete search history.

(56) References Cited

U.S. PATENT DOCUMENTS

2008/0189970 A1   8/2008  Wang et al.
2010/0267394 A1*  10/2010  Wu .............. H04W 24/10
                                                 455/450

(Continued)

FOREIGN PATENT DOCUMENTS

WO   2013104129 A1   7/2013
WO   2017073844 A1   5/2017

OTHER PUBLICATIONS

International Search Report and Written Opinion—PCT/US2018/037567—ISA/EPO—dated Oct. 26, 2018.

(Continued)

*Primary Examiner* — Gary Mui
(74) *Attorney, Agent, or Firm* — Arent Fox LLP

(57) ABSTRACT

In an aspect of the disclosure, a method, a computer-readable medium, and an apparatus are provided. The apparatus, e.g., a base station, maybe configured to obtain UE information of a UE. The apparatus may configure one or more parameters of one or more measurement gaps based on the UE information, and transmit, to the UE, measurement gap information on the one or more measurement gaps. The measurement gap information may include the one or more configured parameters. In another aspect of the disclosure, a UE maybe configured to transmit, to a base station, UE information of the UE. The UE may receive a measurement request from the base station in response to the UE information, where the measurement request includes configuration information for one or more measurement gaps based on the transmitted UE information. The UE may measure one or more reference signals during at least one measurement gap.

13 Claims, 13 Drawing Sheets

(56) References Cited

U.S. PATENT DOCUMENTS

| | | | |
|---|---|---|---|
| 2010/0316000 A1 | 12/2010 | Burbidge et al. | |
| 2012/0113866 A1* | 5/2012 | Tenny | H04W 24/10 370/254 |
| 2012/0178465 A1* | 7/2012 | Lin | H04W 24/10 455/450 |
| 2013/0016690 A1* | 1/2013 | Jeong | H04W 24/10 370/329 |
| 2014/0200002 A1* | 7/2014 | Vangala | H04W 24/10 455/436 |
| 2015/0050889 A1* | 2/2015 | Axmon | H04W 24/08 455/67.11 |
| 2015/0078220 A1 | 3/2015 | Hu et al. | |
| 2015/0327324 A1 | 11/2015 | Wei et al. | |
| 2016/0219452 A1 | 7/2016 | Zingler et al. | |
| 2017/0048027 A1* | 2/2017 | Reial | H04W 48/12 |
| 2017/0127397 A1 | 5/2017 | Hahn et al. | |
| 2018/0213425 A1* | 7/2018 | Huang | H04W 24/10 |
| 2019/0074918 A1* | 3/2019 | Huang | H04B 17/382 |

OTHER PUBLICATIONS

Partial International Search Report—PCT/US2018/037567—ISA/EPO—dated Aug. 14, 2018.
Samsung: "Measurement Gap for NR," 3GPP Draft; R2-1706613, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017, XP051301115, 3 pages, Retrieved from the Internet: URL: http://www.3gpp.org/ftp/Meetings_3GPP_SYNC/RAN2/Docs/ [retrieved on Jun. 26, 2017].

* cited by examiner

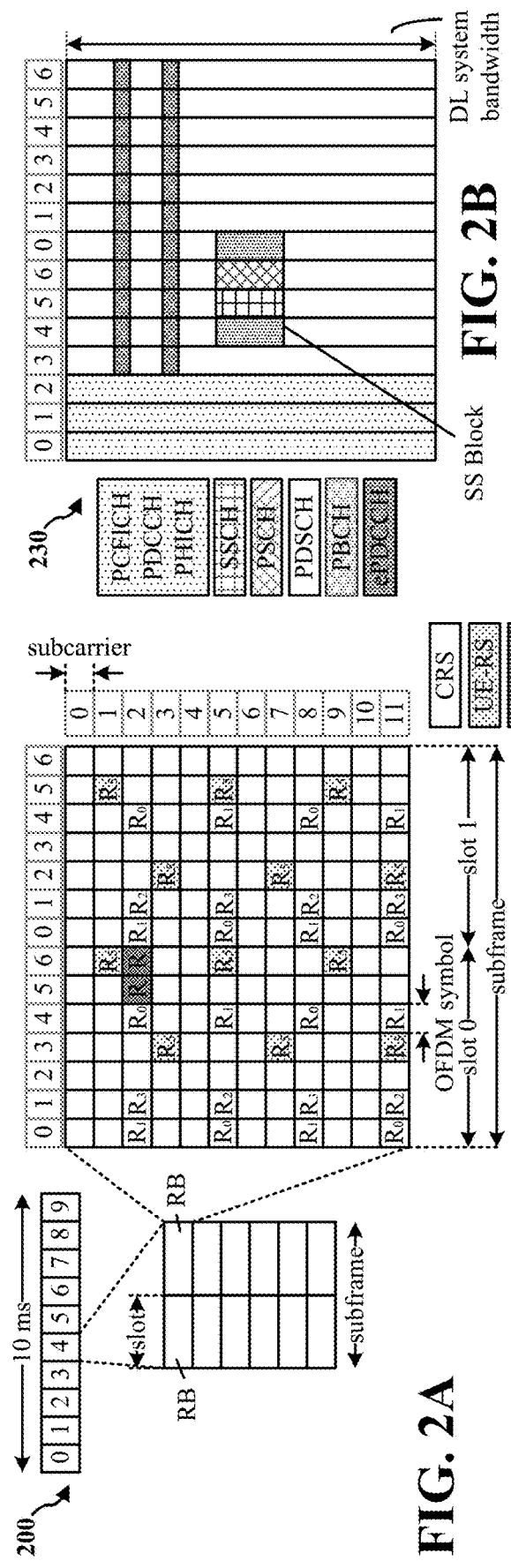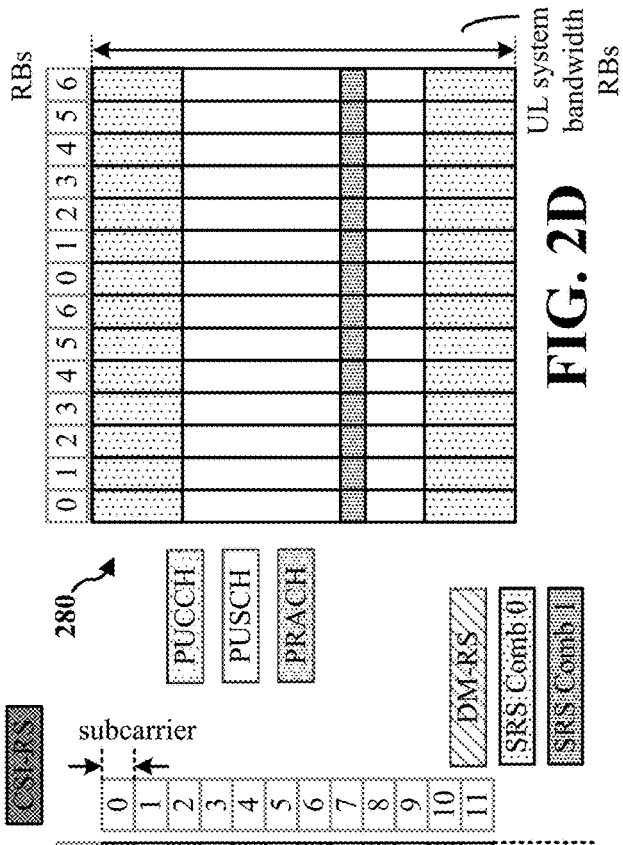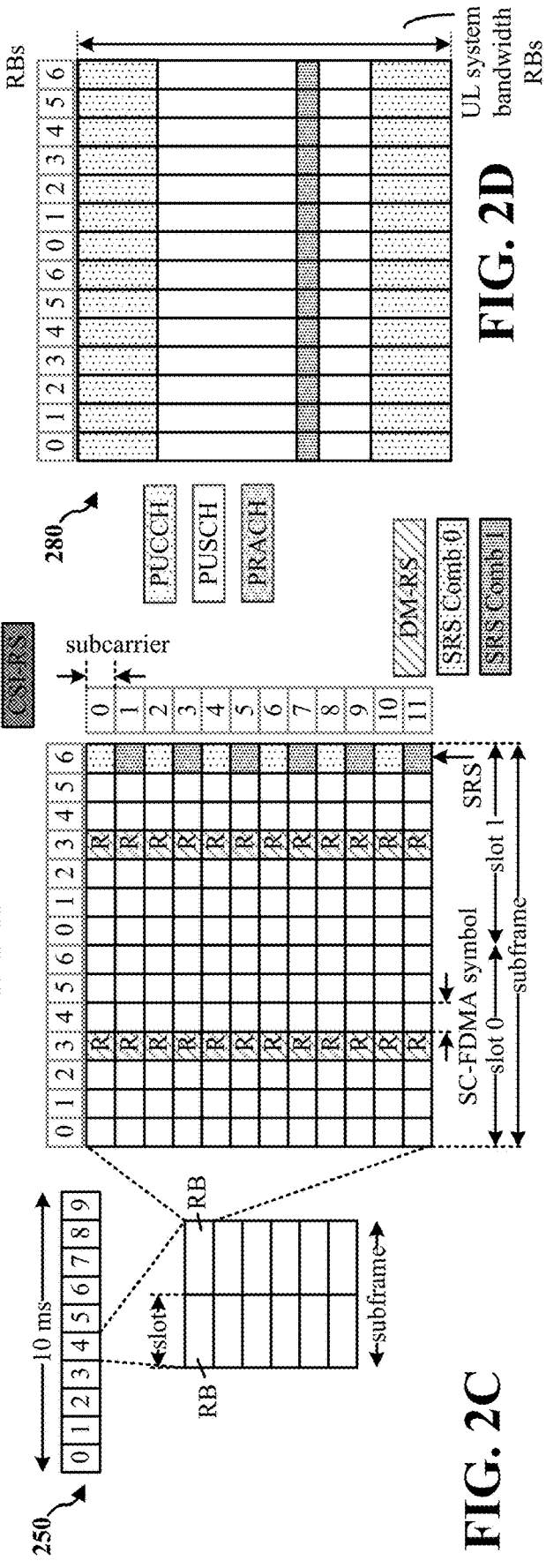
FIG. 2A  FIG. 2B  FIG. 2C  FIG. 2D

TRANSMISSION OPPORTUNITIES DURING MEASUREMENT GAPS

CROSS-REFERENCE TO RELATED APPLICATION(S)

This application claims the benefit of U.S. Provisional Application Ser. No. 62/531,277 entitled "TRANSMISSION OPPORTUNITIES DURING MEASUREMENT GAPS" filed on Jul. 11, 2017, which is expressly incorporated by reference herein in its entirety.

BACKGROUND

Technical Field

The present disclosure relates generally to communication systems, and more particularly, to methods and apparatus for configuring and using measurement gaps for performing measurements in wireless communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some communication systems, beamforming may be used for wireless communication between devices. A beam of the UE and/or a beam of the base station may be directional (e.g., when using a narrow beam pattern). The UE and the base station may communicate with each other using active beams (e.g., an active beam of the UE and an active beam of the base station). The active beams may include a beam pair that includes an active beam of the UE and an active beam of the base station. The beam pair may be used to communicate data channels (e.g., downlink and uplink data channels) and control channels (e.g., downlink and uplink control channels). The base station may monitor beams using beam measurements (e.g., by the UE) and may receive feedback on beams from the UE. To obtain the measurements, the base station may send a measurement request to the UE and indicate measurement gaps during which the measurements may be performed by the UE. The UE may make measurements of the signals during the measurement gaps and send the measurements to the base station. In many systems, the measurement gap may have a fixed duration. However, using measurement gaps with a fixed measurement gap duration may be inefficient in some scenarios. For example, measurement gaps of one duration may be desirable when the UE is stationary, while measurement gaps of another different duration may be better suited when the UE is mobile. Similarly, a UE with enhanced capabilities may complete measurements in a shorter time period as compared to a UE without such capabilities. Thus, configuring measurement gaps of the same duration for the UEs with different capabilities may be inefficient and not desirable. Furthermore, in some scenarios, a UE may need to communicate with a base station even during a measurement gap. Therefore, improving the wireless communication system's performance when measurement gaps are used to make measurements is desired. Accordingly, improved techniques for configuring measurement gaps and associated parameters are desirable.

Various aspects and features related to configuring measurement gaps for a UE based on UE information and use of the configured measurement gaps by the UE are described. The configuration of the measurement gaps (e.g., configuration of one or more parameters such as measurement gap duration, periodicities, repetitions, etc.) may vary depending on the UE information. In some configurations, when multiple measurement gaps may be configured for a UE, the multiple measurement gaps may have different durations and different periodicities.

In an aspect of the disclosure, a method, a computer-readable medium, and an apparatus are provided. The apparatus may be a base station. The base station may obtain UE information of a UE. The base station may configure one or more parameters of one or more measurement gaps based on the UE information. In some configurations, the base station may transmit, to the UE, a measurement request including measurement gap information on the one or more measurement gaps.

In another aspect of the disclosure, a method, a computer-readable medium, and an apparatus are provided. The apparatus may be a UE. The UE may transmit, to a base station, UE information of the UE. The UE may receive a measurement request from the base station in response to the transmission of the UE information. The measurement request may include configuration information for one or more measurement gaps based on the transmitted UE information. In one configuration, the UE may measure one or more reference signals during at least one measurement gap of the one or more measurement gaps.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
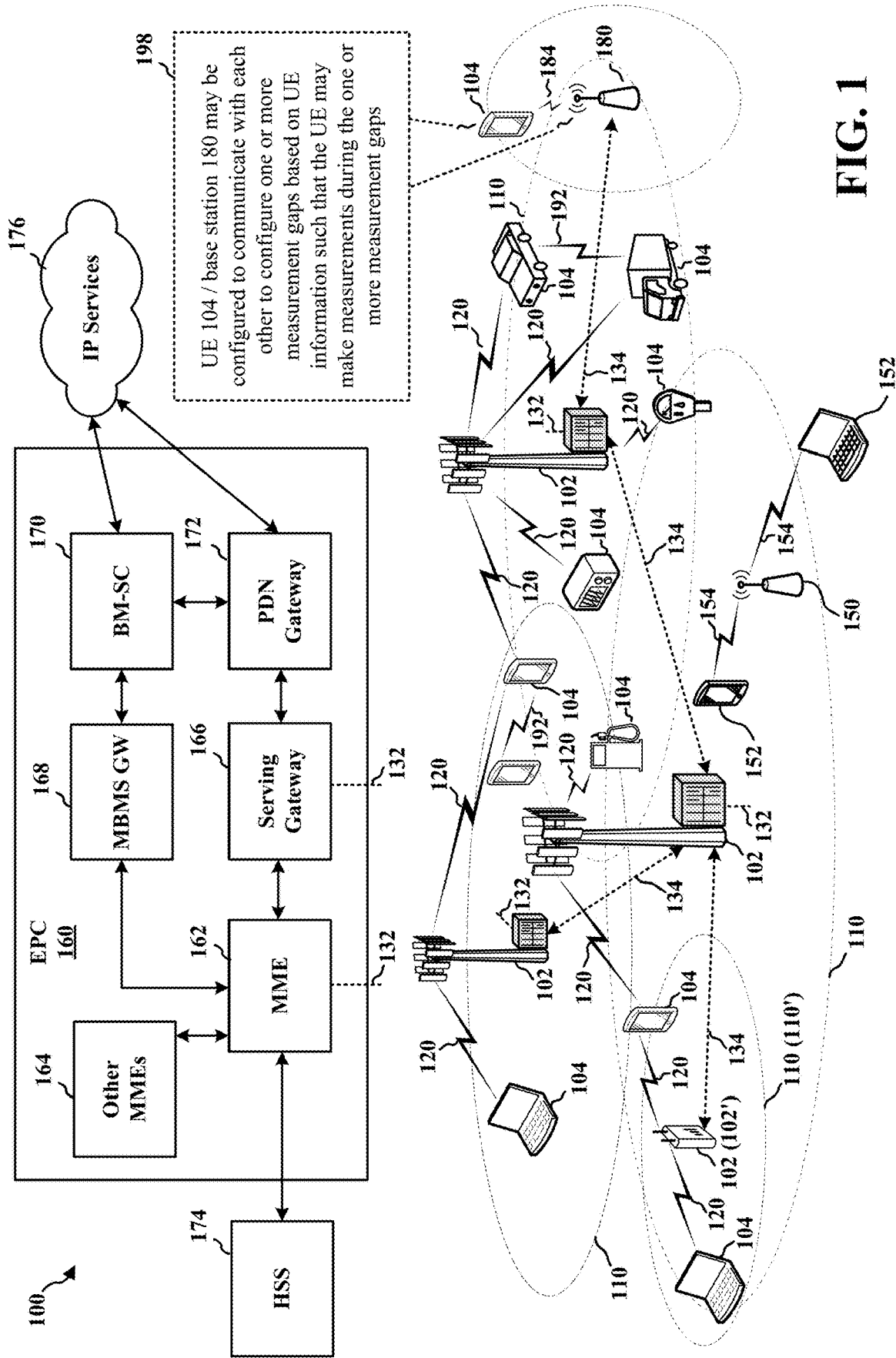
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may be configured to communicate with each other to configure one or more measurement gaps based on UE information such that the UE may make measurements during the one or more measurement gaps (198).

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
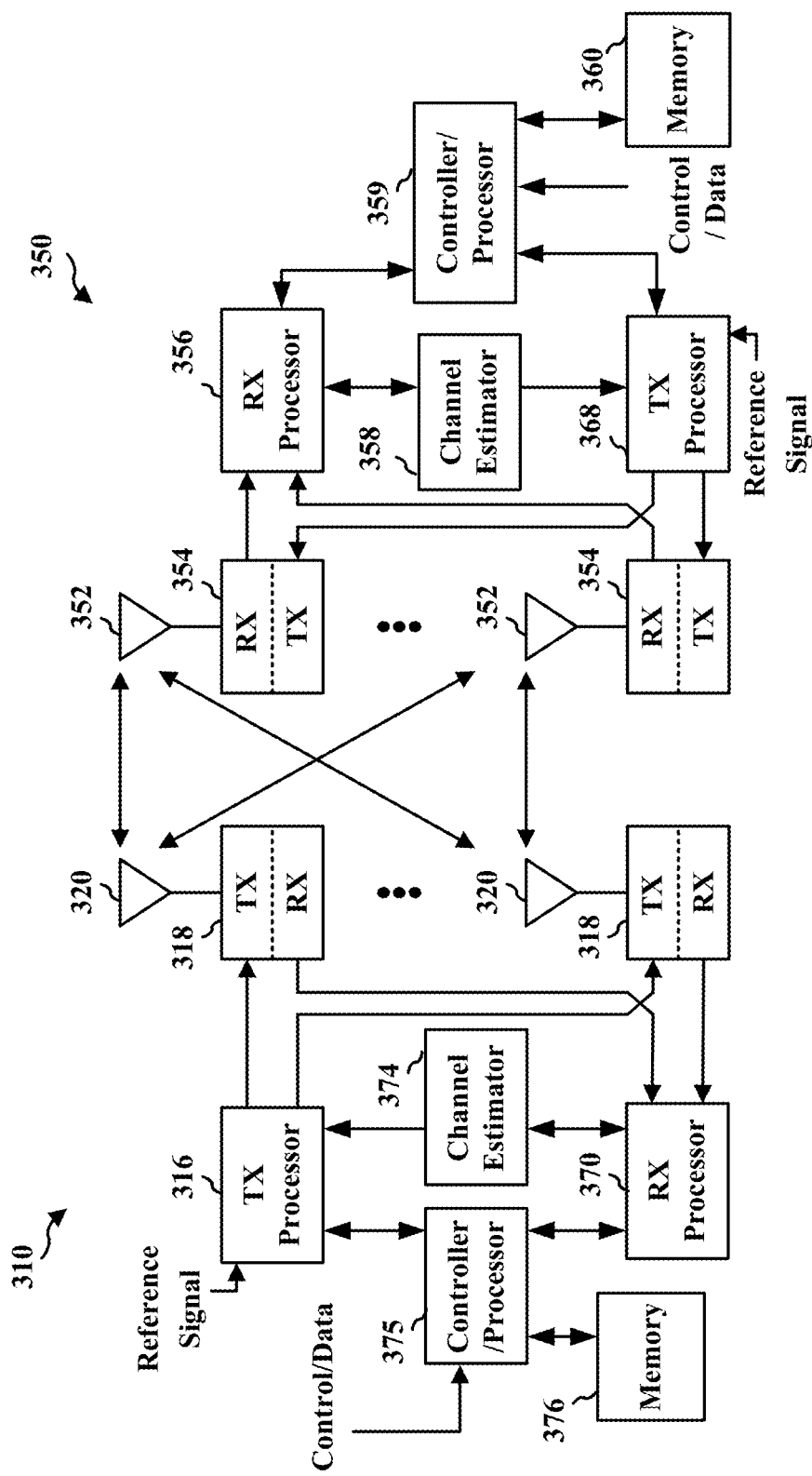
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
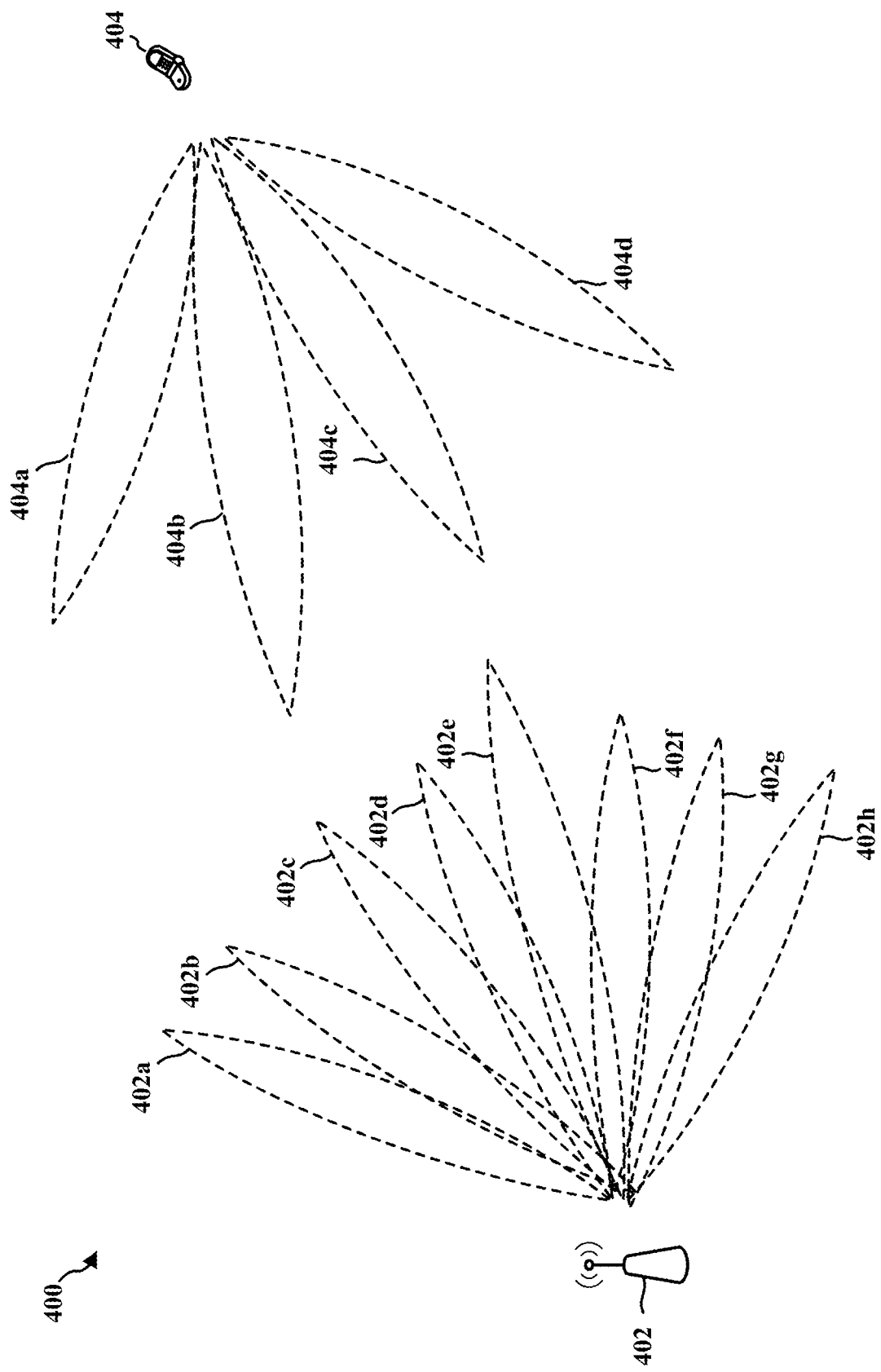
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

High path loss in wireless communication may create challenges in a wireless communication system. A technique such as hybrid beamforming (e.g., analog and digital) may be used to reduce the path loss in wireless communication. For example, hybrid beamforming may create a narrow beam pattern that may enhance link budget/SNR. Communication between a UE and a base station may be performed using a single beam or one or more beams of multiple beams. A beam of the UE and/or a beam of the base station may be directional (e.g., when using a narrow beam pattern). The UE and the base station may be configured to communicate with each other using active beams (e.g., an active beam of the UE and an active beam of the base station). The active beams may include a beam pair that includes an active beam of the UE and an active beam of the base station. The beam pair may be used to communicate data channels (e.g., PDSCH, PUSCH) and control channels (e.g., PDCCH, PUCCH).

The base station may monitor beams using beam measurements (e.g., by the UE) and may receive feedback on beams from the UE. In particular, the base station may monitor active beams (e.g., quality of link(s) formed via the active beams) using measurements of signals (e.g., an NR spectrum sharing (NR-SS) signal, a CSI-RS) that are communicated using respective beams. To obtain the measurements, the base station may send a measurement request to the UE and indicate measurement gaps during which the measurements are to be performed by the UE. When the UE receives the measurement request, the UE may make measurements of the signals during the measurement gaps. After completing the measurements, the UE may send the measurements (e.g., in a measurement report) to the base station. Each measurement gap may have a fixed duration in some configurations. However, using measurement gaps with a fixed measurement gap duration may be inefficient in some scenarios. In a first scenario where the UE is stationary (e.g., not moving), the position of the UE may not change with respect to the position of the base station, and thus the UE may already know one or more beams that are in a direction facing the base station. Therefore, if the UE is stationary, the UE may not need to scan all beam directions but instead scan some beam directions that are facing the base station. Because the UE that is stationary may not need to scan all or an otherwise larger number of beam directions, the UE may complete measurements in a shorter period of time than when the UE scans a larger number of beam directions. For example, the measurement gap may be set to 6 msec in case the UE may scan all beam directions, but the UE that is stationary may complete measurements in 3 msec for the reasons discussed above. In a second scenario where the UE has improved capabilities (e.g., RF chains, antenna panels), the UE may be able to complete measurements in a shorter period of time than a UE without such improved capabilities. For example, the measurement gap may be set to 6 msec in case the UE may not have such improved capabilities, but the UE with such improved capabilities may complete measurements in 3 msec, before the measurement gap ends. In a third scenario, some applications such as ultra-low latency or mission critical messages may require communication with a base station even during a measurement gap. Therefore, improving the wireless communication system's performance when measurement gaps are used to make measurements is desired. In one example, when UE needs to tune away or beamform away from the active beam (e.g., for performing measurements), and/or single or multi-beam operation is performed, one or more of the following features may be implemented.

According to an aspect of the disclosure, a network (e.g., base station 180/310/504) may configure measurement gaps for a UE (e.g., UE 104/350/502) based on UE information, where the configuration (e.g., configuration of measurement gap duration, periodicities, etc.) of the measurement gaps may vary depending on the UE information. In an aspect, when multiple measurement gaps are configured, the multiple measurement gaps may have different durations. In an aspect, multiple measurement gap durations may have different periodicities. For example, a first measurement gap may occur every t1 duration, while a second measurement gap may occur every t2 duration. In one example, smaller measurement gaps (e.g., 1 msec) may occur more frequently than the larger measurement gaps.

In one aspect, smaller gaps may be used for cell measurements (e.g., if the UE has already detected the cell) while longer gaps may be used for cell detection (e.g., if the UE has not detected a cell). Thus, if the UE indicates to the base station that the UE is performing cell measurements, the base station may configure smaller measurement gaps for the UE. If the UE indicates to the base station that the UE is attempting to detect a cell, then the base station may configure large measurement gaps for the UE. In one example, smaller measurement gaps that occur more frequently may be used for cell measurements because the UE may not be attempting to detect a new cell and merely making measurements on signals from a current serving cell. In one example, larger measurement gaps that occur less frequently may be used for cell detection so that the UE may not need to perform detection for a new cell very often and may take a longer time (e.g., due to longer duration of configured measurement gap) to detect a cell during each measurement gap.

In an aspect, the network may configure measurement gaps based on a UE mobility state (e.g., a state indicating whether the UE is mobile or stationary). The UE mobility state may be determined based on UL RS measurement from the UE or feedback from the UE. For example, if the mobility state indicates that the UE is stationary, the base station may configure the UE with less long gaps but more short gaps. For example, if the mobility state indicates that the UE is highly mobile, the base station may configure the UE with more long measurement gaps and less short measurement gaps. In one example, if a base station has 64 beams, in one configuration, the 64 beams may be spread across a 5 msec duration, and these beams may be repeated every 20 msec. Thus, utilization of the 64 beams in the 5 msec duration may be repeated every 20 msec. If the UE is stationary, the UE may make measurements on one or two beams that are in the direction towards the base station at the beginning of the 5 msec duration, and may not make measurements on other beams in other directions.

In an aspect, based on a type of application used for communication between the UE and the network, the network may configure UL resources during measurement gaps to allow UE to transmit on the UL during measurement gaps. For example, if the base station determines that the a given communication between the UE and the base station is associated with a particular type of application (e.g., an ultra-low latency application or a mission critical application), the base station may configure UL resources to be used by the UE during measurement gaps to communicate with the base station so that the UE may communicate information (e.g., latency sensitive signal or mission critical information) corresponding to the particular type of application even during the measurement gaps. The communication associated with the particular type of application may be a control signal and/or a data signal and/or a reference signal. In an aspect, the application may also specify a measurement gap pattern. The measurement gap pattern may indicate a duration of each measurement gap and an interval between measurement gaps. For example, a measurement gap pattern may indicate a duration of each of first measurement gaps (or a duration of just one first measurement gap if the measurement gaps are of equal duration) and an interval between two first measurement gaps, a duration of each of second measurement gaps (or of just one second measurement gap if the second measurement gaps are of equal duration) and an interval between two second measurement gaps. In another example, a measurement gap pattern may indicate a duration of a first measurement gap, a time interval after which the first measurement gap repeats, and a total duration for which the measurement gap pattern may remain effective for use by the UE. In such a case, the first measurement gap may have the indicated duration, repeat in time in accordance with the indicated time interval, and the number of times the first measurement gap repeats may be determined based on the indicated total duration of the measurement gap pattern. For example, the base station may configure a measurement gap pattern with a measurement gap that is 5 msec long (e.g., duration of the measurement gap=5 msec), a time interval of 5 msec between two consecutive measurement gaps, and a duration of the measurement gap pattern of 25 msec. Thus, in accordance with such a measurement gap pattern that is valid for 25 msec, the UE may be able to use a total of 3 measurement gaps of 5 msec each.

In an aspect, the network may send a downlink control channel signal (e.g., PDCCH (in CSS (common search space) and/or USS (user specific search space)) during a measurement gap to check if the UE has completed measurements. For example, if a base station configures a long measurement gap, the UE may complete its measurements before the measurement gap expires and may not go into a sleep mode or may not perform other tasks until the measurement gap expires. In an aspect, if the UE completes its measurements before the measurement gap expires, the UE may monitor for a downlink control channel signal (e.g., in CSS and/or USS). The base station may send a downlink control channel during the measurement gaps to check if the UE has completed the measurements. By sending the downlink control channel signal, the base station may allocate a UL grant and/or may allocate resources for RS transmission on UL, and monitor UE's response. In an aspect, the UE may send a response based on the UL grant or the allocated resources for RS transmission if the UE has completed its measurements. The measurement gap may end when the UE receives the downlink control channel signal from the base station. In an aspect, the base station may allocate a UL grant (e.g., PUCCH or PUSCH) and monitor UE's response. In an aspect, the base station may allocate resources for RS transmission on UL and monitor UE's response.

In an aspect, a network may configure measurement gaps based on UE request for a measurement gap pattern. In particular, the UE may send a request for a measurement gap pattern, and the base station may configure the measurement gaps in response to the request, e.g., based on the requested measurement gap pattern.

In an aspect, a network may configure measurement gaps of a pattern for a predetermined or configured duration. In an aspect, when the base station configures the measurement gaps, the base station may set a duration during which the measurement gap pattern should be used by the UE. For example, the base station may configure a measurement gap that is 5 msec long, and may set the duration of the measurement gap pattern to 20 msec, such that four measurement gaps of 5 msec each may be used by the UE. In some such aspects, after the set duration of 20 msec, the given measurement gap pattern may not be valid.

In an aspect, a network may configure measurement gaps of a pattern for a predetermined or configured repetitions. In particular, the base station may configure a measurement gap pattern, and may configure a number of times the measurement gap pattern should be repeated.

According to another aspect of the disclosure, the UE may request a subset of measurement gaps, where the measurement gaps may have different gap durations or periodicities. In an aspect, based on previous measurements by the UE, (e.g., measurements to determine whether UE is stationary), the UE may (1) request a measurement gap with a short gap duration, and/or (2) request a measurement gap for a subset of beam-identities (IDs), e.g., using a subframe number (SFN), a subframe index (SFI), a slot, and/or a symbol. For example, a specific time period may correspond to a specific beam identifier. The specific time period that corresponds to a specific beam identifier may be defined by a subframe number, a subframe index, a slot/mini-slot, or a symbol. In an aspect, the UE may transmit an explicit request to the base station to request the base station to provide a measurement gap for that duration of time that corresponds to a beam identifier. For example, if the UE is stationary, then the UE may not discover new beams and may utilize the same beams (e.g., which the UE may have previously determined to be optimal for communicating with the base station) to communicate with the base station, where the beams used to communicate with the base station may be a subset of beams that are available for the UE. The UE may request to the base station to provide a measurement gap for a subset of beam identifiers corresponding to the subset of beams. For example, if the UE only sees only beam identifiers 0 and 1 over the past several measurements and does not see beam identifiers 2-64, then we can determine that the UE is stationary and the UE utilizes only a subset of beams corresponding to beam identifiers 0 and 1. Thus, the UE may request to the base station to provide a measurement gap for beam identifiers 0 and 1.

In an aspect, based on inputs from sensors (e.g., global positioning system (GPS), gyroscope, etc.), the UE may (1) request a measurement gap with short gap duration, and/or (2) request a measurement gap for a subset of beam identifiers (e.g., using an SFN, an SFI, a slot, a symbol). For example, if the UE is stationary, then the UE may not discover new beams and may just receive a subset of a total number of beams from the base station in its direction. Thus, the UE may indicate to the base station to provide a measurement gap for a subset of beam identifiers (e.g., beam identifiers that correspond to a direction (e.g., previously determined) toward the base station).

In an aspect, based on previous measurements or inputs from sensors, the UE may notify the network to skip a particular measurement gap (e.g., next measurement gap). For example, if a measurement gap occurs at every 10 msec interval, the UE may notify the base station to skip next upcoming measurement gap (e.g., do not configure the next gap for the UE) based on the previous measurements or sensor inputs. In one example, if the UE is stationary, then the UE may not observe much change in signal quality, and thus the UE may notify the base station that the UE may skip some (e.g., one or more) measurement gaps. In some such cases, the time period corresponding to such skipped measurement gaps may be utilized by the UE to communicate with the base station rather than for performing measurements.

In some configurations, based on a type of application, the UE may request measurement gaps such that the UE may transmit UL communication during the measurement gaps. For example, if the UE determines that the UE uses a particular type of application (e.g., an ultra-low latency application or a mission critical application) to communicate with the base station, the UE may request the base station to configure measurement gaps such that the base station may configure UL resources to be used by the UE during measurement gaps to communicate with the base station using the particular type of application.

In an aspect, the UE may start making measurements during a measurement gap and may complete measurements before the measurement gap ends. For example, the UE may complete the measurements before the measurement gap ends especially if the measurement gap is long. Several features may be implemented for such a scenario. In one aspect, if the UE starts making measurements during a measurement gap and has completed measurements before the measurement gap ends, then the UE may enter into a sleep mode during the remaining time period within the measurement gap. For example, the UE may skip monitoring for a downlink control channel during the remaining time period within the measurement gap after the measurement is completed.

In another aspect, if the UE starts making measurements during a measurement gap and completes the measurements before the measurement gap ends, the UE may use configured UL resources or an indication on UL (e.g., UL RS, PUCCH, PUSCH) to notify the base station of the completion of measurements so that the base station may schedule the UE (e.g., with UL resources) during the measurement gap, e.g., so that the UE may communicate (receive/transmit) with the base station using the remainder of the measurement gap. In one example, between measurement gaps, the base station may configure some UL resources that the UE may use to indicate to the base station that the UE has completed measurements.

In another aspect, if the UE starts making measurements during a measurement gap and has completed measurements before the measurement gap ends, the UE may monitor a downlink control channel signal (e.g., PDCCH (in a CSS or an USS)) in the remaining time period within the measurement gap to see if the base station schedules the UE (e.g., with UL resources) during measurement gaps.

Figure 5:
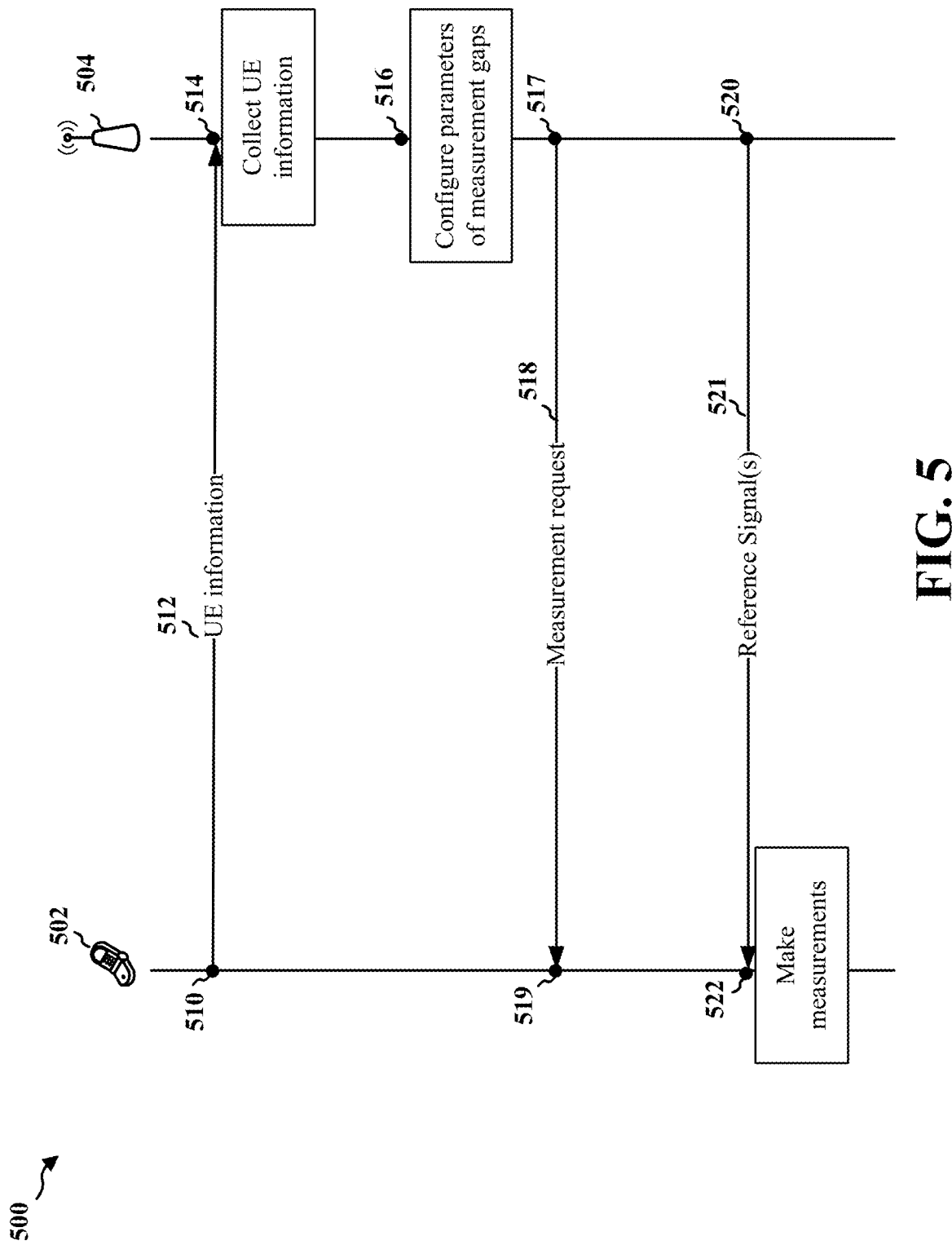
FIG. 5 is an example flow diagram illustrating features performed by a UE and a base station, according to an aspect of the disclosure.

FIG. 5 is an example flow diagram 500 illustrating features performed by a UE 502 and a base station 504, according to an aspect of the disclosure. At 510, the UE 502 may send UE information 512 of the UE 502 to the base station 504. At 514, the base station 504 may collect (e.g., receive) UE information 512 of the UE 502. In an aspect, the UE information 512 may include information indicating whether the UE 502 is making measurements or is attempting to detect a new cell. In an aspect, the UE information 512 may include UE mobility state information. In an aspect, the UE information 512 may include information about a particular type of application that the UE 502 may be using to communicate with the base station 504. For example, as discussed supra, the UE 502 may be exchanging (e.g., transmitting/receiving) latency sensitive and/or mission critical information (e.g., information associated with a latency sensitive and/or mission critical application) with the base station 504. In some such examples, the UE information 512 may indicate that the UE 502 is communicating information associated with such an application. In some configurations, UE information 512 may include a request for a measurement gap pattern.

At 516, the base station 504 may configure parameters of measurement gaps based on the UE information 512, where the measurement gaps may be used by the UE 502 to make measurements. The parameters of the measurement gaps may include, for example, measurement gap duration and measurement gap periodicity. At 517, the base station 504 may send, to the UE 502, a measurement request 518 including information on the configured measurement gaps (e.g., parameters). The UE 502 may receive the measurement request 518 at 519, and may store the received measurement gap configuration information. Furthermore, based on the received measurement gap configuration information in the measurement request 518, the UE 502 may start monitoring for signals during the configured measurement gaps.

At 520, the base station 504 may send a reference signal 521 to the UE 502. At 522, the UE 502 may receive reference signal 521 and make measurements during one or more measurement gaps. In a similar manner, further reference signals and/or other downlink signals may be transmitted by the base station 504 to the UE 504, and the UE 502 may perform measurements during the measurement gaps in accordance with the various aspects described supra.

Figure 6:
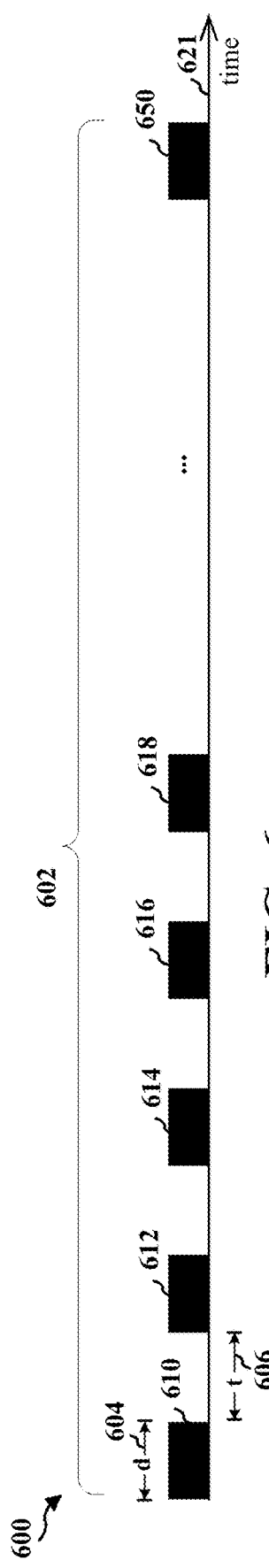
FIG. 6 is a diagram illustrating an example set of measurement gaps configured by a base station for a UE, in accordance with an aspect of the disclosure.

FIG. 6 is a diagram 600 illustrating an example set 602 of measurement gaps configured by a base station (e.g., base station 102/180/310/504) in accordance with the methods and related aspect described herein. The example set 602 of measurement gaps shown in diagram 600 includes a plurality of measurement gaps of the same type (e.g., having same duration and time interval between each of the measurement gaps) including measurement gaps 610, 612, 614, . . . , and 650. In accordance with an aspect, the base station may configure the measurement gaps in the set 602 for a UE (e.g., UE 502) based on UE information (e.g., such UE information 512) received from the UE and/or other information known to the base station that allows configuring suitable measurement gaps for the given UE. For example, smaller duration gaps such as those illustrated in diagram 600 may be suitable for a UE that desires to perform cell measurements, or a stationary UE. The base station may communicate configuration information regarding the measurement gaps to the UE. The configuration information may include, for example, one or more parameters such as measurement gap duration (d), a time interval (t) between each of the measurement gaps/frequency of occurrence/periodicity, number of repetitions and/or duration for which a pattern corresponding the set 602 is valid. Based on such information, the UE may determine the measurement gaps, and use the measurement gaps in the set 602 to make measurements. As illustrated in diagram 600, in this particular example, each of the measurement gaps has a duration "d" 604 and a time period between each measurement gap is indicated by "t" 606. In certain aspects, the set 602 of measurement gaps may be configured in accordance with a requested pattern from the UE. In some such aspects, the base station may configure the measurements gaps of the requested pattern for a predetermined or configured duration. As may be appreciated from a comparison of FIG. 6 and FIG. 7, the measurement gaps of the set 602 have a shorter duration and may occur more frequently than long gaps.

Figure 7:
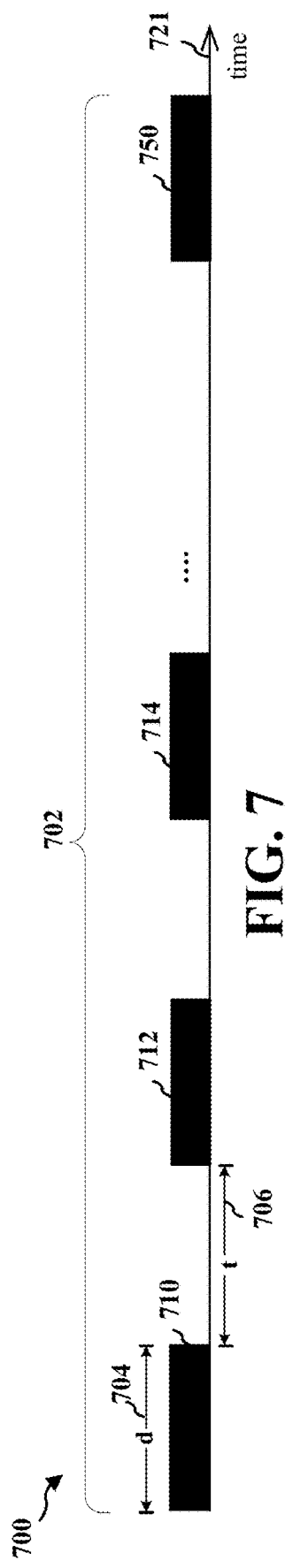
FIG. 7 is a diagram illustrating another example set of measurement gaps configured by a base station for a UE, in accordance with some aspects described herein.

FIG. 7 is a diagram 700 illustrating an example set 702 of measurement gaps configured by a base station (e.g., base station 102/180/310/504) in accordance with some aspects described herein. The example set 702 of measurement gaps shown in diagram 700 includes a plurality of measurement gaps of the same type (e.g., having same duration and time interval between each of the measurement gaps) including measurement gaps 710, 712, 714, . . . , and 750. In accordance with an aspect, the base station may configure the measurement gaps in the set 702 for a UE (e.g., UE 502) based on UE information (e.g., such UE information 512) received from the UE and/or other information known to the base station that enables configuring suitable measurement gaps for the given UE. For example, long duration gaps such as those illustrated in diagram 700 may be suitable for a UE that may need to perform cell detection (e.g., UE attempting to detect a cell). The base station may communicate configuration information regarding the measurement gaps to the UE. The configuration information may include, for example, one or more parameters such as measurement gap duration (d), a time interval (t) between each of the measurement gaps/frequency of occurrence/periodicity, number of repetitions and/or duration for which a pattern corresponding the set 702 is valid. Based on such information, the UE may determine the measurement gaps, and use the measurement gaps in the set 702 to make measurements. As illustrated in diagram 700, in this particular example, each of the measurement gaps has a duration "d" 704 and a time period between each measurement gap is indicated by "t" 706. In certain aspects, the set 702 of measurement gaps may be configured in accordance with a UE requested pattern. In some such aspects, the base station may configure the measurements gaps of the requested pattern for a predetermined or configured duration. As may be appreciated from a comparison of FIGS. 6 and 7, the measurement gaps of the set 702 of diagram 700 have a longer duration and occur less frequently than short gaps.

Figure 8:
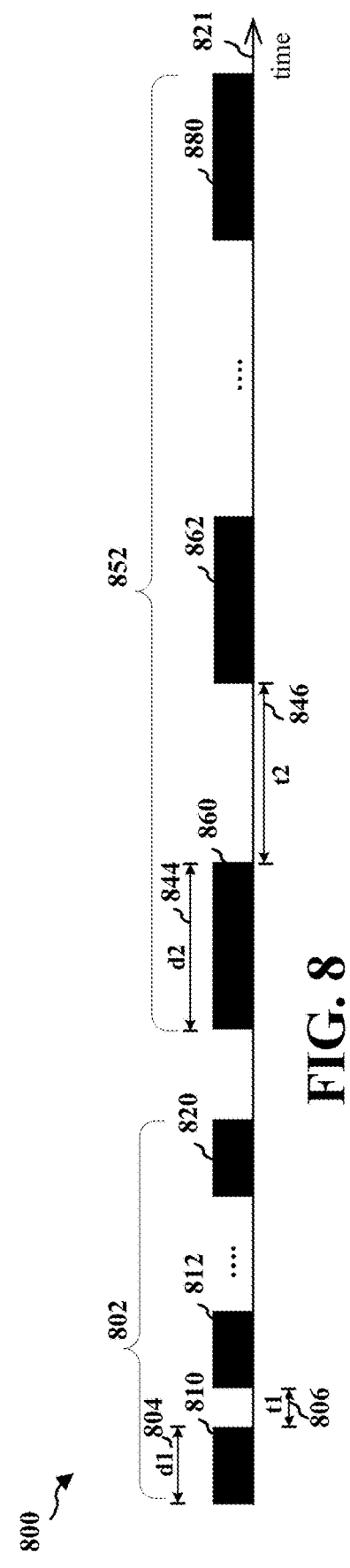
FIG. 8 is a diagram illustrating an example where two sets of measurement gaps are configured by a base station for a UE, in accordance with some aspects described herein.

FIG. 8 is a diagram 800 illustrating an example where two sets of measurement gaps are configured by a base station (e.g., base station 102/180/310/504) in accordance with some aspects described herein. A first set 802 of measurement gaps includes a plurality of measurement gaps including measurement gaps 810, 812, . . . , and 820. A second set 852 of measurement gaps also includes a plurality of measurement gaps including measurement gaps 860, 862, . . . , and 880. In accordance with an aspect, the base station may configure the measurement gaps in the sets 802 and 852 for a UE (e.g., UE 502) based on UE information (e.g., such UE information 512) received from the UE and/or other information known to the base station that enables configuring suitable measurement gaps for the given UE. The base station may communicate configuration information regarding the measurement gaps to the UE. For example, the base station may send a measurement request to the UE and indicate the measurement gaps during which the measurements are to be made by the UE.

As illustrated in diagram 800, in this particular example, each of the measurement gaps in the first set of measurement gaps 802 has a duration "d1" 804 and a time period between each measurement gap is indicated by "t1" 806. Similarly, each of the measurement gaps in the second set of measurement gaps 852 has a duration "d2" 844 and a time period between each measurement gap is indicated by "t2" 846. As shown in the diagram 800, the measurements gaps in the set 802 are shorter in duration and occur more frequently (e.g., high periodicity) while the measurements gaps in the set 852 are longer in duration and occur less frequently (e.g., low periodicity). In certain aspects, the measurement gaps shown in diagram 800 may be configured in accordance with a UE requested pattern. In some such aspects, the base station may configure the measurements gaps of the requested pattern for a predetermined or configured duration.

While some examples of measurement gaps are presented in FIGS. 6-8 to facilitate an understanding and better appreciation of the methods described herein, it should be appreciated that the measurement gaps illustrated in FIGS. 6-8 are just mere specific examples and many variations are possible. Thus, many different measurement gap patterns are possible as may be understood by a person of skill in the art.

Figure 9A:
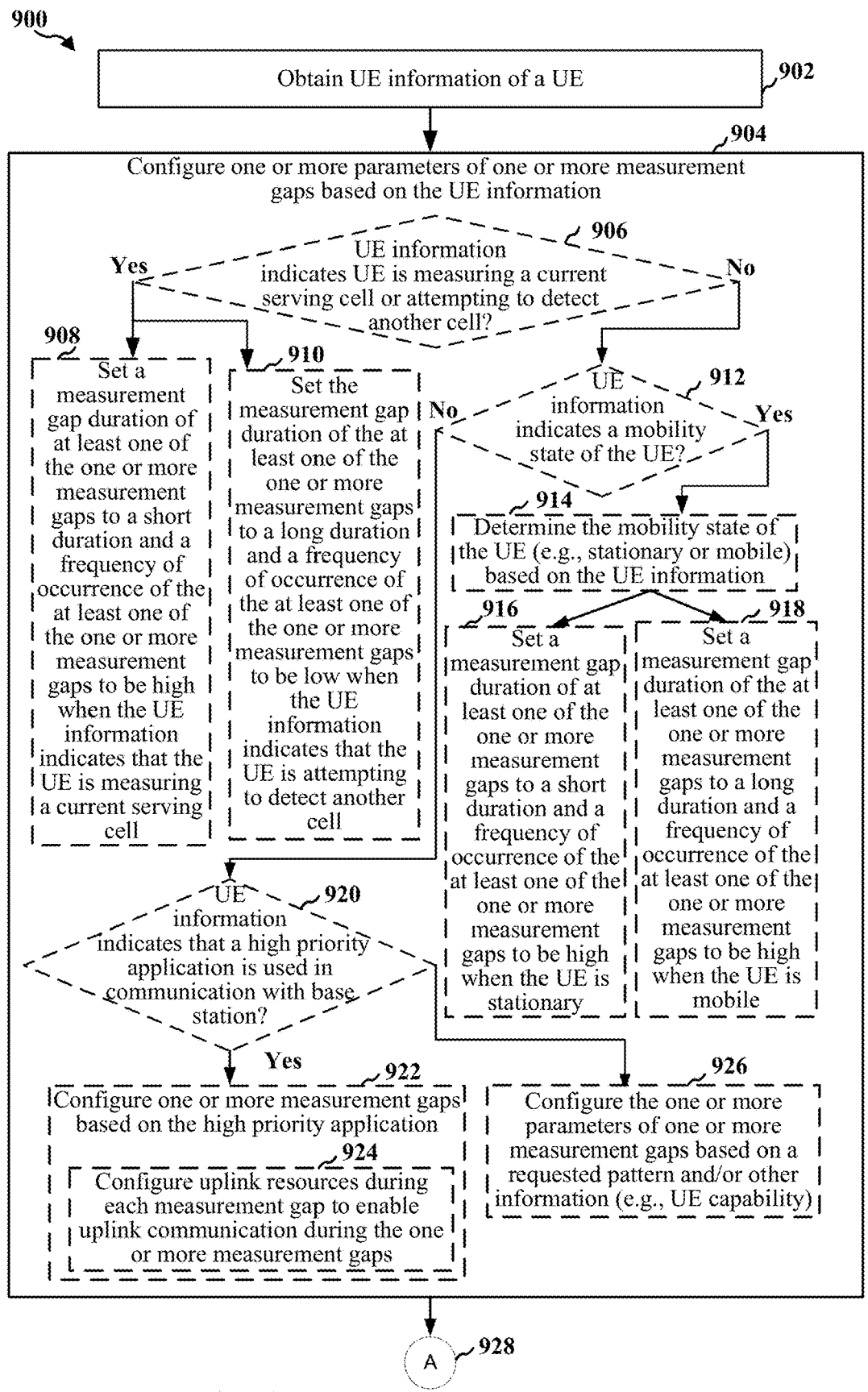
FIG. 9, which comprise a combination of FIGS. 9A and 9B, is a flowchart of an example method of wireless communication.
Figures 9, 9A, 9B:
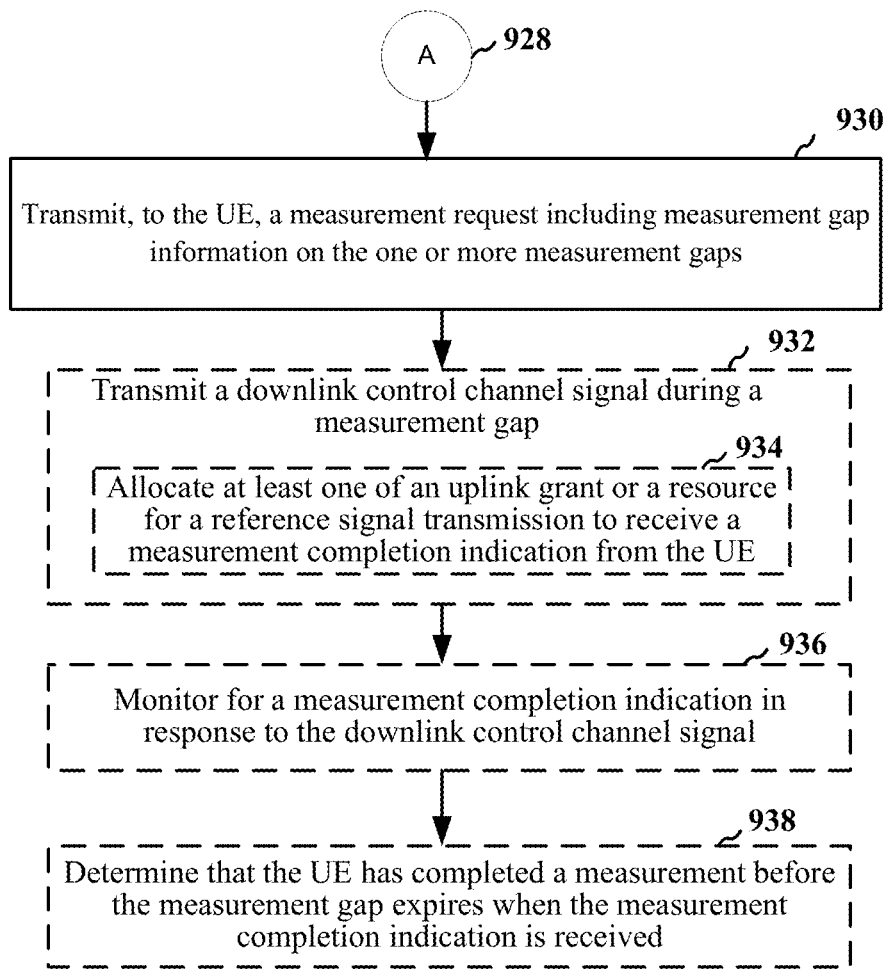

FIG. 9, which comprise a combination of FIGS. 9A and 9B, is a flowchart 900 of a method of wireless communication. FIG. 9A illustrates a first part of the flowchart 900 and FIG. 9B illustrates a second part of the flowchart 900. The method may be performed by a base station (e.g., the base station 102/180/310/504, apparatus 1002/1002'). At 602, the base station may obtain UE information of a UE (e.g., UE 502). For example, with reference to FIG. 5, the base station 504 may receive UE information 512 from the UE 504. In some configurations, the UE information may be obtained by the base station in response to a request from the base station for such UE information. In some other configurations, the UE information may be obtained without any specific request from the base station. In one aspect, the UE information may include information indicating whether the UE 502 is making measurements or is attempting to detect a new cell. In an aspect, the UE information may include UE mobility state information. In an aspect, the UE information may include information about a particular type of application that the UE may be using to communicate with the base station. In some configurations, UE information 512 may include a request for a measurement gap pattern, e.g., such as the measurement gap patterns illustrated in FIGS. 6-8.

At 604, the base station may configure one or more parameters of one or more measurement gaps based on the UE information. As discussed supra, the base station may configure one or more measurement gaps for the UE based on the information obtained from the UE. Depending on a given UE condition or need, measurement gaps with certain parameters (e.g., gap duration, periodicity, number of repetitions etc.) may be suitable for the UE. The UE information may provide an indication of the UE condition and/or desirability of a type of measurement gaps under a given condition to the base station, and the base station may configure the parameters of the measurement gaps accordingly. For example, configuring the one or more parameters of the one or more measurement gaps may comprise configuring a measurement gap duration of the one or more measurement gaps, setting a time interval between each of the one or more measurement gaps, and configuring a number of repetitions for each of the one or more measurement gaps. In some configurations, the operation at 904 of configuring parameters of one or more measurement gaps based on the UE information may include one or more sub-operations illustrated in the blocks shown within the block 904. In some configurations, at 906 the base station may determine whether the UE information indicates a cell measurement or cell detection related activity at the UE. For example, at 906 the base station may determine whether the UE information indicates that the UE is measuring a current serving cell (after already having detected the current serving cell) or attempting to detect another cell. If at 906 it is determined that the UE information indicates that the UE is measuring a current serving cell or attempting to detect another cell, then the operation proceeds to 908 and/or 910. At 908, the base station may configure the one or more parameters of one or measurement gaps based on the determination of block 906. For example, at 908 the base station may set a measurement gap duration of at least one of the one or more measurement gaps to a short duration (e.g., a time period less than a predetermined threshold time period) and a frequency of occurrence of the at least one of the one or more measurement gaps to be high (e.g., to occur/repeat more frequently) when the UE information indicates that the UE is measuring a current serving cell. As discussed supra, in one aspect, smaller gaps may be used for cell measurements while longer gaps may be used for cell detection (e.g., if the UE has not detected a cell). Thus, if the UE indicates to the base station that the UE is performing cell measurements, the base station may configure smaller measurement gaps for the UE. In one example, smaller measurement gaps that occur more frequently may be used for cell measurements because the UE may be merely making measurements on signals from a current serving cell and may not be attempting to detect a new cell. When the UE information indicates that the UE is attempting to detect another cell, then at 910, the UE may set the measurement gap duration of the at least one of the one or more measurement gaps to a long duration (e.g., a time period greater than a predetermined threshold time period) and a frequency of occurrence of the at least one of the one or more measurement gaps to be low (e.g., less frequently occurring). Thus, in some configurations, if the UE indicates to the base station that the UE is attempting to detect a cell, then the base station may configure large measurement gaps for the UE. As discussed supra, larger measurement gaps that occur less frequently may be used for cell detection so that the UE may not need to perform detection for a new cell very often and may use a longer time (e.g., due to longer configured duration) to detect a cell during each measurement gap.

In one configuration, at 912, the base station may determine whether the UE information indicates a mobility state of the UE, e.g., whether the UE is stationary or highly mobile. In one such configuration, the base station may configure measurement gaps based on the UE mobility state. If the base station determines that the UE information indicates a mobility state of the UE, then at 914 the base station may determine the mobility state of the UE (e.g., stationary or mobile) based on the UE information. The UE mobility state may be determined based on UL RS measurement or a feedback from the UE. In certain configurations, the base station may configure the UE with less long gaps but more short gaps when the mobility state indicates that the UE is stationary. In one such configuration, at 916, the base station may set a measurement gap duration of at least one of the one or more measurement gaps to a short duration and a frequency of occurrence of the at least one of the one or more measurement gaps to be high when the UE mobility state is determined to be stationary. Because the UE that is stationary may not need to scan all or an otherwise larger number of beam directions, and the UE may complete measurements in a shorter period of time than when the UE scans a larger number of beam directions. However, when the UE mobility state is determined to be mobile, at 918, the base station may set a measurement gap duration of the at least one of the one or more measurement gaps to a long duration and set a frequency of occurrence of the at least one of the one or more measurement gaps to be high. Thus, based on the UE information when the UE mobility state is determined to be mobile, the base station may configure the UE with more long measurement gaps and less short measurement gaps.

In certain configuration, the UE may information may indicate a type of application (e.g., high priority application or critical service related application) used in communication with the base station, and the base station may configure measurement gaps for the UE based on the type of application. In one such configuration, at 920, the base station may determine if the UE information indicates that a high priority application is used in communication with the base station. If the UE information indicates that the UE is using a high priority application in communicating with the base station, then at 922 the base station may configure the one or more parameters of one or more measurement gaps based on the high priority application. For example, the high priority application may be a low/ultra-low latency application or a mission critical application. The base station may configure the measurement gap parameters that suit the UE engaged in communication associated with the high priority application. In one example, as part of configuring one or more measurement gaps based on the high priority application, at 924 the base station may configure UL resources to be used by the UE during each of the one or more measurement gaps to communicate with the base station so that the UE may communicate information (e.g., latency sensitive signal or mission critical information) corresponding to the particular type of application even during the measurement gaps. The communication associated with the high priority application may be a control signal and/or a data signal and/or a reference signal.

In some configuration, if at 920 it is determined that the UE information does not indicate use of a high priority application, the operation may proceed to 926. At 926, the base station may configure the one or more parameters of one or more measurement gaps based on a requested pattern and/or other information (e.g., UE capability) indicated in the UE information. For example, the UE information may indicate a UE requested pattern of measurement gaps, e.g., defining one or more desired sets of measurement gaps that repeat/occur for a desired length of time. In such an example, the base station may configure the measurement gaps for the UE based on the requested pattern. For example, a UE may request measurement gaps with a pattern such as illustrated in FIG. 8, where the UE may desire first measurement gaps of duration d1 occurring every t1 seconds for a time period T1 (thereby defining a number of repetitions of the first measurement gaps within time period T1) and second measurement gaps of duration d2 occurring every t2 seconds for a time period T2. Based on the requested pattern indicated in the received UE information, the base station may configure the one or more parameters (e.g., duration, periodicity, number of repetitions etc.) of the measurement gaps for the UE. In an aspect, when multiple measurement gaps are configured, the multiple measurement gaps may have different durations. In another example, the UE information may indicate a UE capability, e.g., indicating that UE supports enhanced capability with a greater number of RF chains, greater number of antenna panels/arrays etc. In such a case, the UE with the enhanced capability may be able to complete measurements in a shorter period of time than a UE without such improved capabilities. Thus, in such a case, at 926 the base station may configure the UE with measurement gaps with shorter duration. Having configured the measurement gaps in accordance with the UE information, the operation proceeds from 906 to 930 via connecting node A 928.

At 930, the base station transmits, to the UE, a measurement request including measurement gap information on the one or more measurement gaps. The measurement gap information may include the one or more configured parameters of the one or more measurement gaps, e.g., to allow the UE to determine the measurement gaps configured for the UE.

In an aspect, the network may send a downlink control channel signal (e.g., PDCCH in CSS and/or USS) during a measurement gap to check if the UE has completed measurements. For example, if a base station configures a long measurement gap, the UE may complete its measurements before the measurement gap expires and may not go into a sleep mode or may not perform other tasks until the measurement gap expires. Thus, in one configuration, at 932, the base station may transmit a downlink control channel signal (e.g., PDCCH) during a measurement gap, e.g., to check if the UE has completed the measurements. In such a case, on the UE side, if the UE completes its measurements before the measurement gap expires, the UE may monitor for the downlink control channel signal (e.g., in CSS and/or USS) from the base station. In some configurations, as part of the downlink control channel signal, an uplink grant (e.g., PUCCH or PUSCH) or a resource may be allocated to the UE for sending a measurement completion indication to the base station. Thus, in some configurations, at 934, the base station may allocate at least one of an uplink grant or a resource for a reference signal transmission to receive a measurement completion indication from the UE. For example, via the downlink control channel signal, the base station may allocate a UL grant and/or may allocate resources for RS transmission on UL.

At 936, the base station may monitor for a measurement completion indication in response to the downlink control channel signal. For example, the base station 504 may allocate resources for RS transmission on the uplink and monitor for a response from UE 502. In an aspect, the UE 504 may send a response based on the UL grant or the allocated resources for RS transmission if the UE 502 has completed its measurements during a given measurement gap.

At 938, the base station may determine that the UE has completed a measurement before the measurement gap expires when the measurement completion indication is received. For example, if the base station 504 receives the measurement completion indication from the UE 502 before the expiration of the given measurement gap, then the base station 504 may consider that the UE 502 has completed the measurement before the expiration of the measurement gap (e.g., in time period less than the full length of the duration given measurement gap.

Figure 10:
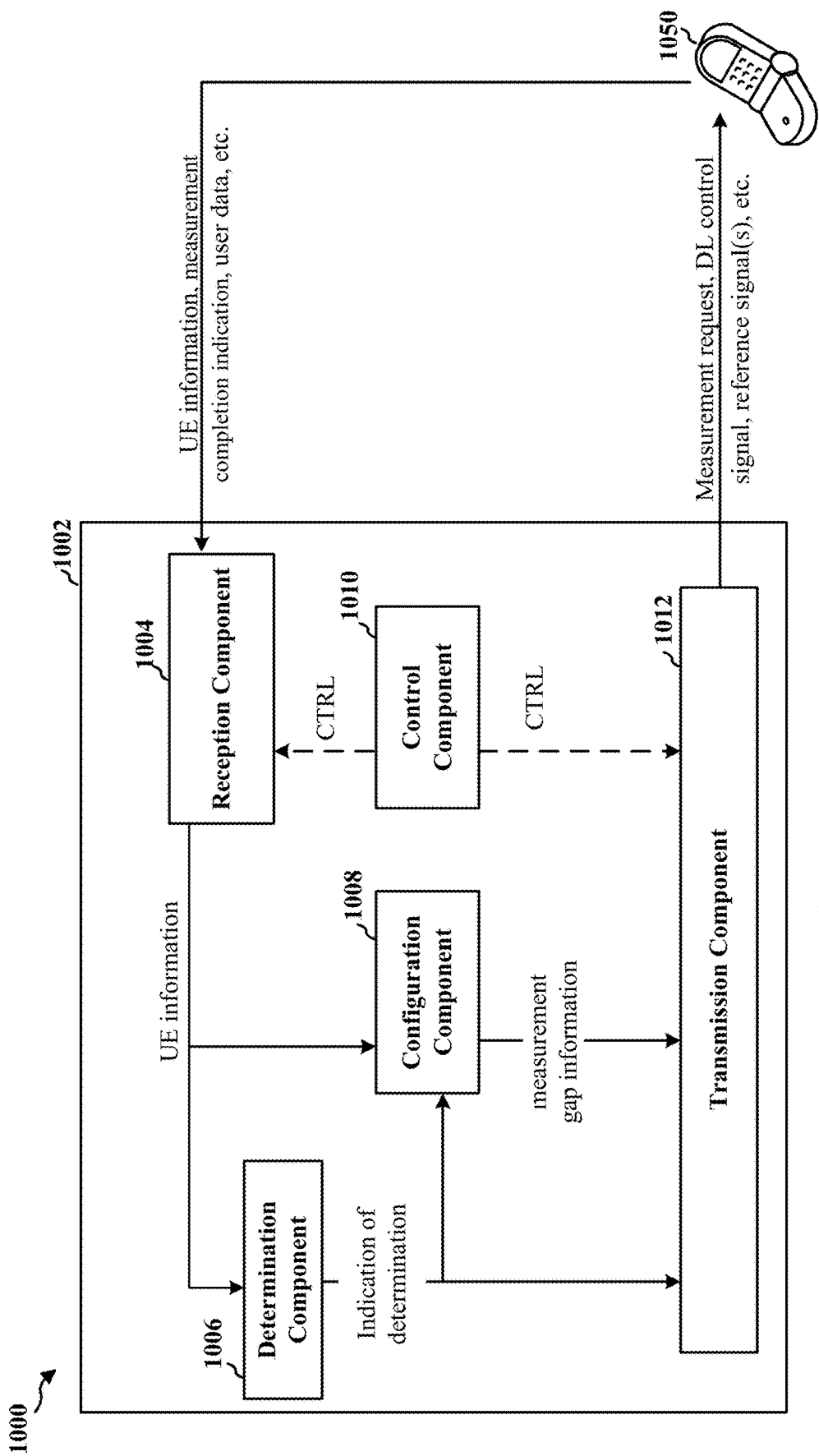
FIG. 10 is a conceptual data flow diagram illustrating the data flow between different means/components in an exemplary apparatus.

FIG. 10 is a conceptual data flow diagram 1000 illustrating the data flow between different means/components in an example apparatus 1002. The apparatus 1002 may be a base station (e.g., such as base station 102, 180, 310, 504, 1350). The apparatus 1002 may include a reception component 1004, a determination component 1006, a configuration component 1008, a control component 1010, and a transmission component 1012.

The reception component 1004 may be configured to receive messages and/or other information from other devices including, e.g., UE 1050. The signals/information received by the reception component 1004 may be provided to one or more components of the apparatus 1002 for further processing and use in performing various operations in accordance with the methods discussed supra including the method of flowchart 900. In some configurations, the reception component 1004 may receive UE information from a UE (e.g., UE 1050). Thus, the reception component 1004 may be configured to obtain the UE information from the UE 1050. For example, referring to FIG. 5, the apparatus 1002 may be the base station 504 and the UE 1050 may be the UE 502, and via the reception component 1004, the base station 504 may obtain the UE information 512 from the UE 502. As discussed in more detail supra, in an aspect, the UE information may include information indicating whether the UE 1050 is making measurements or is attempting to detect a new cell. In some aspects, the UE information may include UE mobility state information. In some aspects, the UE information may include information about a particular type of application that the UE 502 may be using to communicate with the base station 504. In some configurations, reception component 1004 may process the received UE information and provide the UE information to the determination component 1006 and the configuration component 1008.

The determination component 1006 may be implemented as a standalone component or as part of the configuration component 1008. The determination component 1006 may be configured to determine what the obtained UE information indicates about the UE. For example, the determination component 1006 may be configured to determine whether the UE information indicates a specific indication of an operation (e.g., such as cell measurement/cell search) performed at the UE 1050, UE capability, mobility state, use of high priority application, or a requested measurement gap pattern etc., based on the UE information. Based on the determination, the determination component 1006 may provide information to the configuration component 1008 to facilitate configuration of one or more parameters of measurement gaps for the UE 1050. For example, in one configuration, the determination component 1006 may determine whether the UE information indicates that the UE 1050 is measuring a current serving cell or attempting to detect another cell, and provide an indication of the determination to the configuration component 1008. In one configuration, the determination component 1006 may determine a mobility state of the UE 1050 based on the UE information, e.g., whether the UE 1050 is stationary or mobile, and provide an indication of the determined mobility state to the configuration component 1008. In one configuration, the determination component 1006 may determine whether the UE information indicates that a high priority application is used in communication with the apparatus 1002, and provide an indication of the determination to the configuration component 1008. In one configuration, the determination component 1006 may determine whether the UE information indicates a UE 1050 requested measurement gap pattern and provide an indication of the requested measurement gap pattern to the configuration component 1008. As mentioned above, in some configurations, the determination component 1006 may be implemented as part (e.g., as a component of) of the configuration component 1008.

The configuration component 1008 may configure one or more parameters (e.g., measurement gap duration, periodicity, number of repetitions, etc.) of one or more measurement gaps based on the UE information, e.g., as discussed supra in connection with block 904 of flowchart 900. In some configurations, the configuration component 1008 may configure the parameters of the one or more measurement gaps based on the input from the determination component 1006 regarding the content of the UE information. In various configurations, configuring the one or more parameters by the configuration component 1008 may include, configuring a measurement gap duration, configuring a time interval between each of the one or more measurement gaps, configuring a number of repetitions for each of the one or more measurement gaps. In one configuration, the configuration component 1008 may set a measurement gap duration (e.g., a parameter) of at least one of the one or more measurement gaps to a short duration (e.g., less than a predetermined threshold measurement gap duration) when the UE information indicates that the UE is measuring a current serving cell. In one configuration, the configuration component 1008 may set the measurement gap duration of the at least one of the one or more measurement gaps to a long duration when the UE information indicates that the UE is attempting to detect another cell. In one configuration, the configuration component 1008 may configure a frequency of occurrence of the at least one of the one or more measurement gaps having a long duration to a first occurrence frequency, and a frequency of occurrence of the at least one of the one or more measurement gaps having a short duration to a second occurrence frequency, where the first occurrence frequency is less than the second occurrence frequency.

In some configurations, the UE information may indicate a mobility state of the UE 1050, and the configuration component 1008 may configure one or more parameters of the measurement gaps based on the mobility state. For example, in one configuration, the configuration component 1008 may set a measurement gap duration of at least one of the one or more measurement gaps to a short duration and a frequency of occurrence of the at least one of the one or more measurement gaps to be high when the mobility state of the UE indicates that the UE is stationary. In one configuration, the configuration component 1008 may set the measurement gap duration of the at least one of the one or more measurement gaps to a long duration and a frequency of occurrence of the at least one of the one or more measurement gaps to be high when the mobility state indicates that the UE is mobile.

In some configurations, the UE information may indicate that a high priority application is used in communication between the apparatus 1002 and the UE 1050. In one such configuration, the configuration component 1008 may configure uplink resources during each measurement gap of the one or more measurement gaps to enable the UE to perform uplink communication during the one or more measurement gaps using the uplink resources. The high priority application may include a low-latency application or a mission-critical application.

In some configuration, the UE information may indicate a UE requested measurement gap pattern and/or UE capability information, and the configuration component 1008 may configure one or more parameters of the measurement gaps in accordance with the requested measurement gap pattern or the UE capability information. For example, in one configuration, the configuration component 1008 may configure the parameters (e.g., duration, time interval between measurement gaps, number of repetitions, etc.) of the measurement gaps for the UE based on the requested pattern. In one configuration, where the UE information may indicate a UE capability (e.g., indicating that UE supports enhanced capability with a greater number of RF chains, greater number of antenna panels/arrays etc.), the configuration component 1008 may configure the UE with measurement gaps with shorter duration. In various configurations, the configuration component 1008 may provide measurement gap configuration information on the one or more measurement gaps to the transmission component 1012 for transmission to the UE 1050. In one configuration, the measurement gap information may include the one or more configured parameters of the one or more measurement gaps.

The transmission component 1012 may be configured to transmit measurement gap information, data, downlink control signal(s) and/or reference signal(s) to one or more external devices, e.g., including UE 1050. In some configurations, the transmission component 1012 alone, in combination with and/or under the control of the controller/control component 1010, may be configured to transmit a measurement request including measurement gap information on the one or more measurement gaps to the UE 1050. For example, with reference to FIG. 5, the apparatus 1002 may be the base station 504 which ay transmit (via the transmission component 1012) the measurement request 518 including measurement gap information on the one or more measurement gaps to the UE 502. Thus, via the transmission component 1012, the apparatus 1002 may transmit the one or more configured parameters of the one or more measurement gaps to the UE 1050.

In some configurations, the transmission component 1012 may be further configured to transmit one or more reference signals to the UE 1050. The UE 1050 may monitor for the reference signals from the apparatus 1002, and perform measurements (e.g., received signal power, signal quality and/or other measurements) on the reference signal during the one or more measurement gaps.

In one configuration, the control component 1010 may be configured to allocate at least one of an uplink grant or a resource for a reference signal transmission to receive a measurement completion indication from the UE 1050. The transmission component 1012 alone, in combination with and/or under the control of a controller/control component 1010, may be further configured to transmit a downlink control channel signal during a measurement gap to the UE 1050. In some configurations, the transmitted downlink control channel signal includes the uplink grant allocation or an indication of the allocated resource for the reference signal transmission.

In some configurations, the reception component 1004 alone, in combination with and/or under the control of the controller/control component 1010, may be configured to monitor for a measurement completion indication in response to the transmitted downlink control channel signal. In one configuration, the determination component 1008 may be configured to determine whether the UE has completed a measurement before the measurement gap expires based on whether the measurement completion indication is received. In one example, the UE 1050 may complete measurement(s) in a measurement gap before the measurement gap expires, and may receive the downlink control channel signal from the apparatus 1002 discussed above. In such an example, the reception component 1004 may receive the measurement completion indication in response to the transmitted downlink control channel signal. In such an example, the determination component 1008 may be configured to determine that the UE 1050 has completed a measurement before the measurement gap expires when the measurement completion indication is received.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
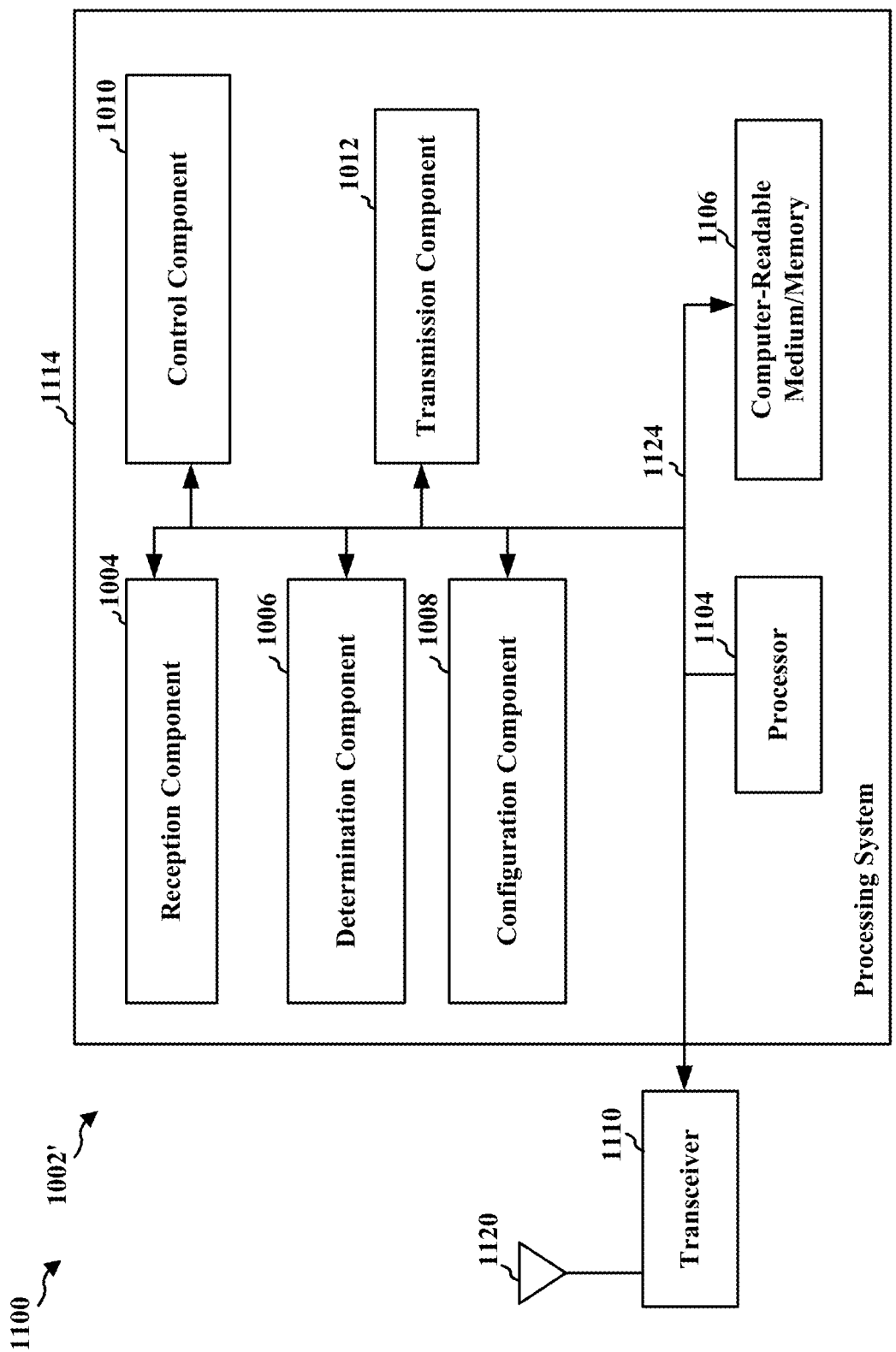
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, and 1012. The components may be software components running in the processor 1104, resident/stored in the computer-readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for obtaining UE information of a UE. The apparatus 1002/1002' may further include means for configuring one or more parameters of one or more measurement gaps based on the UE information. In some configurations, the apparatus 1002/1002' may further include transmitting, to the UE, a measurement request including measurement gap information on the one or more measurement gaps. In some configurations, the measurement gap information may include the one or more configured parameters of the one or more measurement gaps.

In one configuration, the means for configuring the one or more parameters of the one or more measurement gaps based on the UE information may be configured to set a measurement gap duration of at least one of the one or more measurement gaps to a short duration when the UE information indicates that the UE is measuring a current serving cell. In one configuration, the means for configuring the one or more parameters of the one or more measurement gaps may be configured to set the measurement gap duration of the at least one of the one or more measurement gaps to a long duration when the UE information indicates that the UE is attempting to detect another cell. In one configuration, the means for configuring the one or more parameters may be further configured to set/configure a frequency of occurrence of the at least one of the one or more measurement gaps having a long duration to a first occurrence frequency. In one such configuration, the means for configuring the one or more parameters may be further configured to set/configure a frequency of occurrence of the at least one of the one or more measurement gaps having a short duration to a second occurrence frequency. In some such configurations, the first occurrence frequency is less than the second occurrence frequency.

In one configuration, the means for configuring the one or more parameters of the one or more measurement gaps may be configured to determine a mobility state of the UE based on the UE information. The UE information may include at least one of uplink reference signal, or feedback information from the UE. In one such configuration, the means for configuring the one or more parameters may be further configured to set a measurement gap duration of at least one of the one or more measurement gaps to a short duration and a frequency of occurrence of the at least one of the one or more measurement gaps to be high when the mobility state of the UE indicates that the UE is stationary. In one such configuration, the means for configuring the one or more parameters may be further configured to set the measurement gap duration of the at least one of the one or more measurement gaps to a long duration and a frequency of occurrence of the at least one of the one or more measurement gaps to be high when the mobility state indicates that the UE is mobile.

In one configuration, the means for configuring the one or more parameters of the one or more measurement gaps may be configured to determine that a high priority application is used in communication between the base station and the UE based on the UE information. In such a configuration, the means for configuring the one or more parameters of the one or more measurement gaps may be further configured to configure uplink resources during each measurement gap of the one or more measurement gaps to enable the UE to perform uplink communication during the one or more measurement gaps using the uplink resources.

In some configurations, the means for transmitting may be further configured to transmit a downlink control channel signal during a measurement gap. In one such configuration, the apparatus may further include means for monitoring for a measurement completion indication in response to the downlink control channel signal. In some such configurations, the apparatus may further include means for determining that the UE has completed a measurement before the measurement gap expires when the measurement completion indication is received. In some such configurations, the apparatus may further include means for allocating at least one of an uplink grant or a resource for a reference signal transmission to receive the measurement completion indication from the UE.

In some configurations, the UE information may include a requested measurement gap pattern. In some such configurations, the means for configuring the one or more parameters of the one or more measurement gaps may be configured to configure the one or more parameters based on the requested measurement gap pattern. In some configurations, the means for configuring the one or more parameters of the one or more measurement gaps may be configured to set a time interval between each of the one or more measurement gaps. The means for configuring the one or more parameters of the one or more measurement gaps may be further configured to set a number of repetitions for each of the one or more measurement gaps for the UE.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
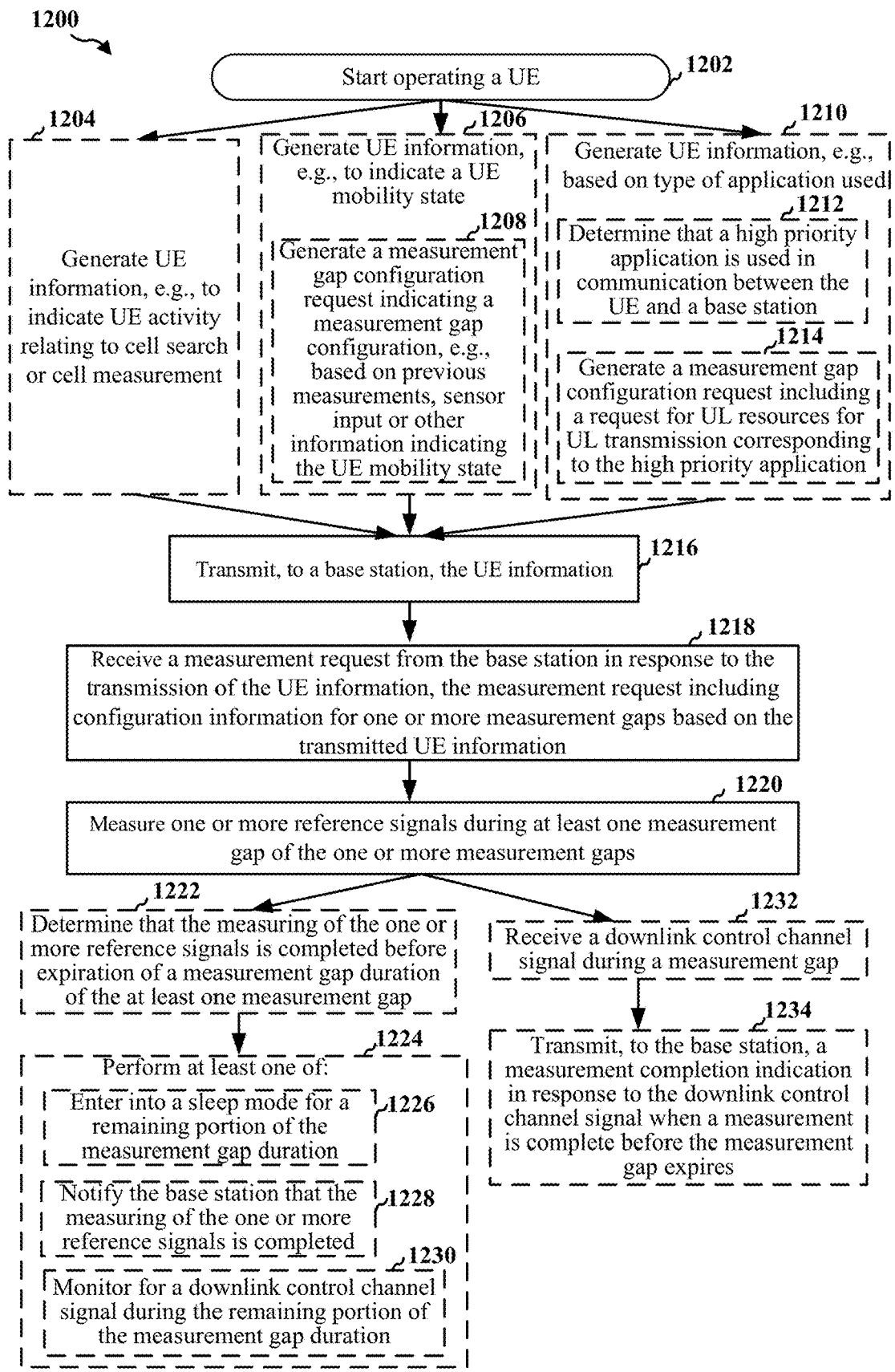
FIG. 12 is a flowchart of another example method of wireless communication.

FIG. 12 is a flowchart 1200 of an example method of wireless communication. The method may be performed by a UE (e.g., the UE 104/350/502/1050, the apparatus 1302). The example method starts at 1202 with the UE being initialized for operation. Operation proceeds from 1202 to the next block along one of the three alternative paths shown illustrated. For example, depending on a given configuration and/or UE condition and/or activity, the UE may communicate UE information of different types to the base station (e.g., base station 404). As discussed in detail supra, the base station may then configure one or more measurement gap parameters based on the UE information.

First considering a case where the UE may wish to indicate cell search or cell measurement activity to the base station in the UE information. In one configuration, at 1204, the UE may generate UE information indicating that the UE is measuring a current serving cell or attempting to detect another cell. Operation proceeds from block 1204 to block 1216.

Referring to the second alternative path, in one configuration, at 1206, the UE may generate UE information based on a UE mobility state (e.g., stationary or mobile) to indicate the mobility state of the UE in the UE information. In some configurations, the UE mobility state may be determined based on previous measurements (e.g., of reference signal) and/or sensor inputs. In some configurations, as part of generating the UE information, at 1208 the UE may generate a measurement gap configuration request indicating a measurement gap configuration. The measurement gap configuration request may be generated based on the previous measurements, and/or sensor inputs and/or other information known to the UE. The previous measurements, and/or sensor inputs and/or other information (e.g., location history) may indicate the mobility state of the UE. Thus, in some configurations, the UE may include, in the UE information, a request for a desired measurement gap configuration that may suit the mobility state of the UE. In some configurations, the measurement gap configuration may include at least one of a measurement gap duration, or at least one beam identifier for a measurement. For example, as discussed supra, the UE may indicate a desired measurement gap duration for measurement gaps, or beam identities (e.g., using a SFN, SFI, a slot, and/or a symbol) for which measurement gaps are requested. For example, a specific time period may correspond to a specific beam identifier, and the specific time period that corresponds to a specific beam identifier may be identified by a subframe number, a subframe index, a slot/mini-slot index, or a symbol index. In one configuration, the measurement gap configuration (indicated in the measurement gap configuration request) may include a short measurement gap duration when the mobility state indicates that the UE is stationary, and a long measurement gap duration when the mobility state indicates that the UE is mobile. In one such configuration, a frequency of occurrence of a measurement gap having the short measurement gap duration is greater than a frequency of occurrence of a measurement gap having the long measurement gap duration. In another aspect, the measurement gap configuration (indicated in the measurement gap configuration request) may comprise a subset of a plurality of beam identifiers when the mobility state indicates that the UE is stationary, and the plurality of beam identifiers when the mobility state indicates that the UE is mobile. Thus, in various configurations, based on the mobility state, the UE may request different measurement gap configurations in the UE information. Operation proceeds from block 1206 to block 1216.

In a third alternative (illustrated on the right side branch), another type of UE information may be generated by the UE. In some configurations, at 1210, the UE may generate UE information based on a type of application used for communication between the UE and a base station. For example, the UE may be using a high priority application in communicating with the base station and may generate UE information indicating the same. Thus, in one configuration, as part of the operation at 1210 of generating the UE information, at 1212 the UE may determine that a high priority application is used in communication with the base station, e.g., based on UE's knowledge of the type of application (e.g., ultra low latency, mission critical, etc.) used in a given communication. In some configurations, as part of generating the UE information, at 1214 the UE may generate a measurement gap configuration request including a request for UL resources for UL transmission corresponding to the high priority application during one or more measurement gaps. Thus, in some configurations, the UE may include, in the UE information, a request for UL resources requesting UL resources for transmitting information (e.g., data and/or control signal) corresponding to the high priority application even during a measurement gap. Operation proceeds from block 1210 to block 1216.

At 1216, the UE may transmit, to a base station, the UE information of the UE (e.g., generated in accordance with one of the above discussed blocks 1204, 1206 and 1210). As discussed supra, depending on the type of UE information generated in a given configuration, the transmitted UE information may include or indicate different types of information. For example, in an aspect the UE information may indicate whether the UE is making measurements or is attempting to detect a new cell. In another aspect, the UE information may indicate UE mobility state information or include a measurement gap configuration request based on the mobility UE state. In another aspect, the UE information may include information about a particular type of application that the UE may be using to communicate with the base station or may include a measurement gap request for UL resources. In another example, the UE information may include information a request for a measurement gap pattern.

At 1218, the UE may receive a measurement request from the base station in response to the transmission of the UE information. The measurement request may include configuration information for one or more measurement gaps based on the transmitted UE information. As discussed supra in connection with FIG. 5, flowchart 900, and elsewhere, upon obtaining the UE information from the UE, the base station may configure one or more parameters (e.g., measurement gap duration, periodicity, number of repetitions, etc.) of one or more measurement gaps for the UE. The base station may then send back a measurement request (e.g., measurement request 518) including configuration information that defines the measurement gap parameters configured by the base station for the given UE based on the UE information and/or the measurement gap configuration request discussed above.

At 1220, the UE may measure one or more reference signals during at least one measurement gap of the one or more measurement gaps. For example, after configuring the UE with the one or more measurement gaps based on the UE information as discussed above, the base station may transmit one or more reference signals (e.g., reference signal(s))

for the UE to measure during the one or more measurement gaps. Accordingly, in one configuration, the UE may measure one or more reference signals during at least one measurement gap (e.g., measuring received signal power, signal quality and/or other parameters).

In certain configurations, the operation proceeds from 1220 to 1222. At 1222, the UE may determine that the measuring of the one or more reference signals is completed before expiration of a measurement gap duration of the at least one measurement gap. For example, the UE may have been configured with long measurement gaps and may complete measurement in lesser time that the measurement gap duration, or due to enhanced UE capability the UE may complete measurement in lesser time.

In one configuration, upon determining that the measuring of the one or more reference signals is completed before expiration of a measurement gap duration, at 1224, the UE may perform at least one of the operations illustrated at blocks 1226, 1228, or 1230. In one configuration, upon determining that the measuring of the one or more reference signals is completed before expiration of a measurement gap duration, the UE may enter into a sleep mode for a remaining portion of the measurement gap duration, as illustrated at 1226. Thus, in some configurations, when the UE has completed a measurement prior to the expiration of the measurement gap duration, the UE go to sleep mode, e.g., to conserve battery power. In another configuration, upon determining that the measuring of the one or more reference signals is completed before expiration of a measurement gap duration, the UE may notify the base station that the measuring of the one or more reference signals is completed, as illustrated at 1228. For example, as discussed supra, if the UE has completed measurements then the UE may use configured UL resources or an indication on UL (e.g., UL RS, PUCCH) to notify the completion of measurements so that the network can schedule the UE during the measurement gap. In another configuration, upon determining that the measuring of the one or more reference signals is completed before expiration of a measurement gap duration, the UE may monitor for a downlink control channel (e.g., PDCCH) for a signal during the remaining portion of the measurement gap duration, as illustrated at 1230. For example, as discussed supra, if the UE has completed measurements then the UE may monitor PDCCH (common or user specific) during the remaining gap duration to see if the network schedules the UE during measurement gaps. In some configurations, if the network wants to schedule the UE during the measurement gaps, then the UE may send a signal on the downlink control channel to indicate the same.

In some other configurations, the operation proceeds from 1220 to 1232. At 1232, the UE may receive a downlink control channel signal during a measurement gap. For example, the base station send a PDCCH signal during a measurement gap in which the UE may be performing measurements to check if the UE has completed measurements. The base station may allocate UL grant (e.g., PUCCH) or resources for RS transmission on UL to the UE in the downlink control channel signal. The UE may receive such a downlink control channel signal and decide to send a response, e.g., if the UE has completed measurements.

Operation proceeds from 1232 to 1234. At 1234, the UE may transmit, to the base station, a measurement completion indication in response to the downlink control channel signal when a measurement is complete before the measurement gap expires.

Figure 13:
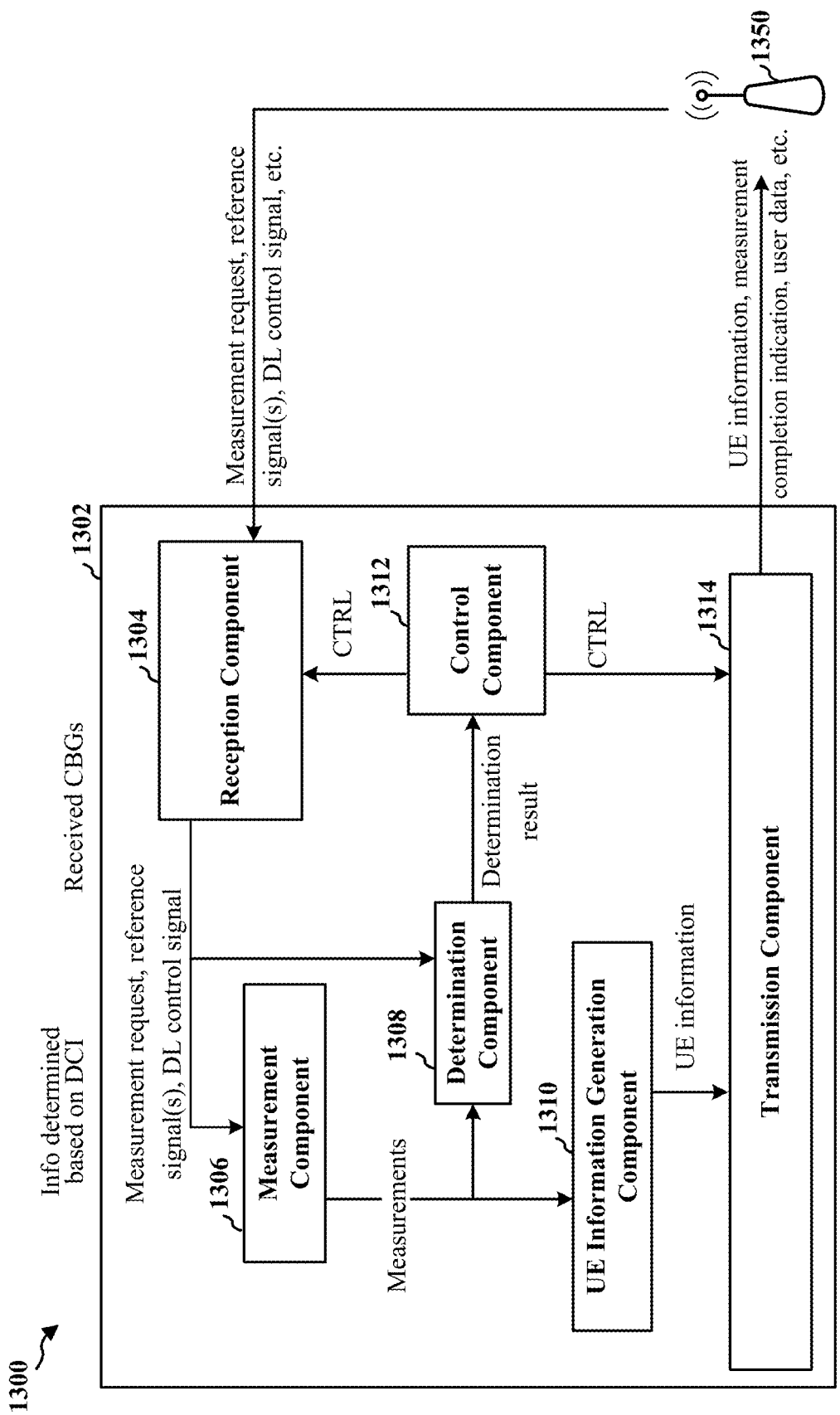
FIG. 13 is a conceptual data flow diagram illustrating the data flow between different means/components in an exemplary apparatus.

FIG. 13 is a conceptual data flow diagram 1300 illustrating the data flow between different means/components in an example apparatus 1302. The apparatus 1302 may be a UE (e.g., such as UE 104, 350, 502, 1050). The apparatus 1302 may include a reception component 1304, a measurement component 1306, a determination component 1308, a UE information generation component 1310, a control component 1312, and a transmission component 1314. While not shown in the diagram, the apparatus 1302 may further include a variety of sensors (e.g., such as GPS, gyros, accelerometers, and/or position sensors).

The reception component 1304 may be configured to receive signals and/or other information from other devices including, e.g., base station 1350. The signals/information received by the reception component 1304 may be provided to one or more components of the apparatus 1302 for further processing and use in performing various operations in accordance with the methods discussed supra including the method of flowchart 1200. In some configurations, the reception component 1304 may receive, from a base station (e.g., base station 1350), a measurement request including configuration information for one or more measurement gaps, reference signal(s), downlink control channel signal(s) etc. In some configurations, the reception component 1304 alone, in combination with and/or under the control of the controller/control component 1312, may be configured to monitor to receive a downlink control channel signal during a portion of a measurement gap. The transmission component 1314 may be configured to transmit the various signals and information to one or more external devices, e.g., including base station 1350, in accordance with the methods disclosed supra. For example, the transmission component 1314 may be configured to transmit UE information (information regarding the apparatus 1302, e.g., a UE) to the base station 1350. In various configurations, the transmission component 1314 may transmit the UE information generated by the UE information generation component 1310 discussed below.

The UE information generation component 1310 may be configured to generate the UE information in accordance with the methods disclosed supra. For example, depending on a given configuration and/or UE condition and/or activity, the UE information generation component 1310 may generate UE information of different types as discussed in connection with blocks 1204, 1206, 1208, 1210, 1212, and 1214 of flowchart 1200. For example, in one configuration the UE information generation component 1310 may generate UE information indicating that the UE is measuring a current serving cell or attempting to detect another cell. In one configuration, the UE information generation component 1310 may generate UE information based on a UE mobility state (e.g., stationary or mobile) to indicate the mobility state of the UE in the UE information. In some configurations, the UE mobility state may be determined based on previous measurements (e.g., of reference signal) performed by the measurement component 1306 and/or based on input from sensors (e.g., GPS, gyro, and/or other sensors). In some configurations, as part of generating the UE information, the UE information generation component 1310 may generate a measurement gap configuration request indicating a measurement gap configuration. The measurement gap configuration may be generated based on the previous measurements, and/or sensor inputs and/or other information known to the UE. In some configurations, the measurement gap configuration may include at least one of a measurement gap duration, or at least one beam identifier for a measurement. In one configuration, the measurement gap configuration (indicated in the measurement gap configuration request included in the UE information) may include a short measurement gap duration when the mobility state indicates that the UE is stationary, and a long measurement gap duration when the mobility state indicates that the UE is mobile. In another configuration, the measurement gap configuration (indicated in the measurement gap configuration request) may comprise a subset of a plurality of beam identifiers when the mobility state indicates that the UE is stationary, and the plurality of beam identifiers when the mobility state indicates that the UE is mobile.

In one configuration, the UE information generation component 1310 may generate UE information based on a type of application used for communication between the apparatus 1302 and the base station. For example, in one configuration, the UE information generation component 1310 may determine that a high priority application is used in communication with the base station 1350. In such a configuration, as part of generating the UE information, the UE information generation component 1310 may generate a measurement gap configuration request including a request for UL resources for UL transmission corresponding to the high priority application during one or more measurement gaps. The measurement gap configuration request may be included in, or generated as part of the UE information. The generated UE information may be provided to the transmission component 1314 for transmission to the base station 1350. As discussed supra, the transmission component 1314 may transmit the UE information to the base station 1350, and the reception component 1304 may receive a measurement request from the base station 1350 in response to the transmission of the UE information, where the measurement request may include configuration information for one or more measurement gaps based on the transmitted UE information.

The measurement component 1306 may be configured to perform various measurements on received signals in accordance with the methods and aspects disclosed herein. For example, the measurement component 1306 may be configured to perform measurements on one or more received reference signals during at least one measurement gap of the one or more measurement gaps configured by the base station 1350 for the apparatus 1302 based on the transmitted UE information. The measurement component 1306 may provide the measurements to one or more other components of the apparatus 1302.

The determination component 1308 may be configured to determine that the measuring of the one or more reference signals is completed (e.g., by the measurement component 1306) before expiration of a measurement gap duration of the at least one measurement gap. The determination component 1308 may be configured to provide the outcome of the determination to the control component 1312. The control component 1312 may be configured to control the apparatus 1302 and/or one or more components therein to operate in accordance with the methods of flowchart 1200 and various other aspects discussed above. For example, in one configuration, based on the outcome of the determination (performed by the determination component 1308), the control component 1312 may be configured to control the operation of the transmission component 1314 and/or the reception component 1304. For example, when it is determined that the measuring of the one or more reference signals is completed before expiration of a measurement gap duration, the control component 1312 may control the apparatus 1302 to enter into a sleep mode for a remaining portion of the measurement gap duration (e.g., turn off the reception component 1304 for the remaining portion of the measurement gap duration. In one configuration, when it is determined that the measuring of the one or more reference signals is completed before expiration of a measurement gap duration, the control component 1312 may control the transmission component 1314 to transmit a notification to the base station 1350 that the measuring of the one or more reference signals is completed. In one configuration, when it is determined that the measuring of the one or more reference signals is completed before expiration of a measurement gap duration, the control component 1312 may control the reception component 1304 to monitor for a downlink control channel (e.g., PDCCH) for a signal during the remaining portion of the measurement gap duration.

In some configurations, the reception component 1204 may receive the UE may receive a downlink control channel signal during a measurement gap from the base station 1350. For example, the base station 1350 may send a PDCCH signal during a measurement gap in which the UE may be performing measurements to check if the UE has completed measurements. The base station 1350 may allocate UL grant (e.g., PUCCH) or resources for RS transmission on UL to the apparatus 1302 in the downlink control channel signal. In one configuration, the transmission component 1314 alone, in combination with and/or under the control of the controller/control component 1312, may transmit, to the base station 1350, a measurement completion indication in response to the downlink control channel signal when a measurement is complete before the measurement gap expires.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
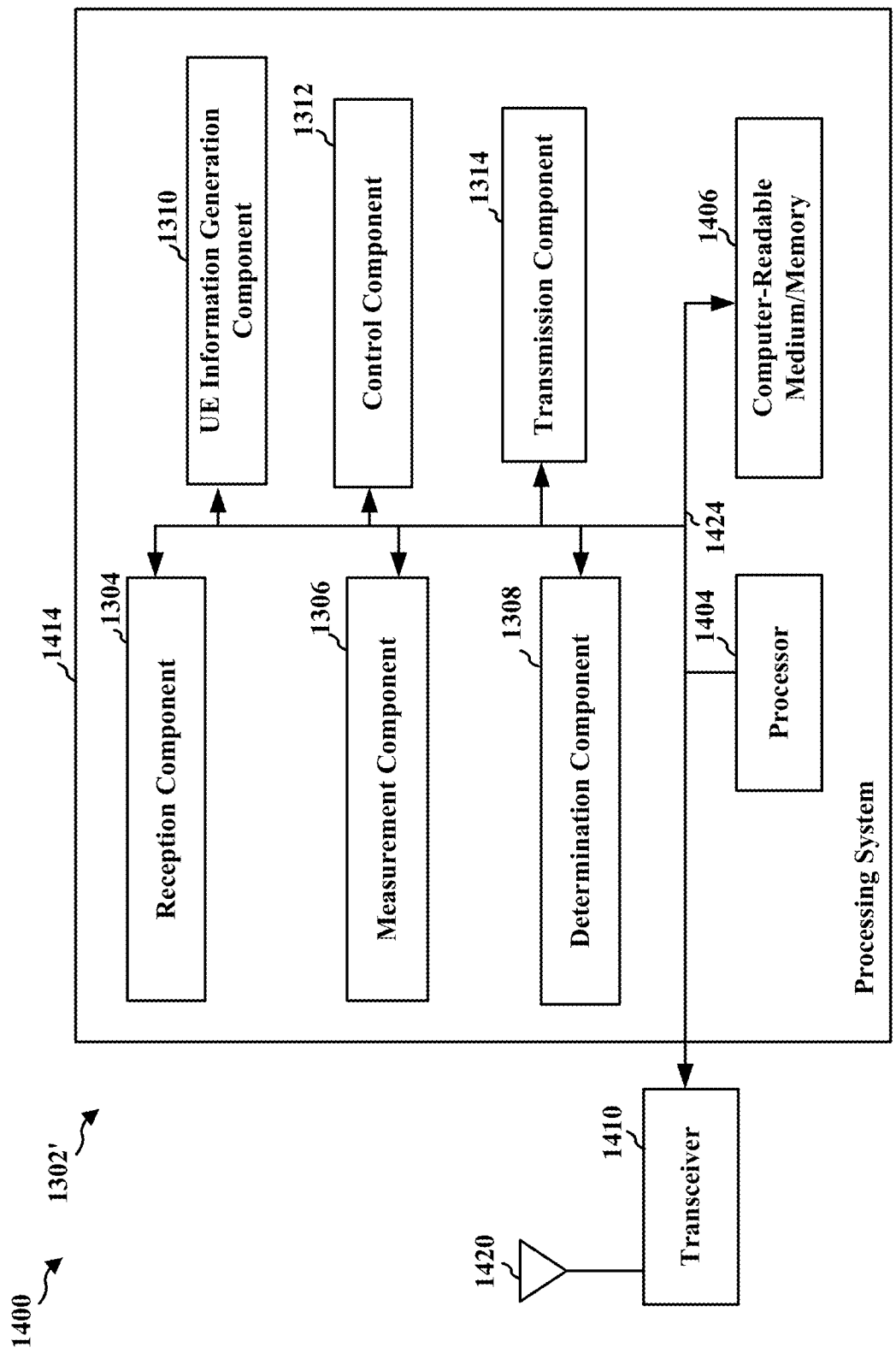
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1314, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer-readable medium/memory 1406, one or more hardware components coupled to the processor 1404, or some combination thereof. The processing system 1414 may be a component of the UE 350 and may include the memory 360 and/or at least one of the TX processor 366, the RX processor 356, and the controller/processor 359.

In one configuration, the apparatus 1302/1302' for wireless communication is a UE, and may include means for transmitting, to a base station, UE information of the UE. The apparatus 1302/1302' may further comprise means for receiving a measurement request from the base station in response to the transmission of the UE information, the measurement request including configuration information for one or more measurement gaps based on the transmitted UE information. The apparatus 1302/1302' may further comprise means for measuring one or more reference signals during at least one measurement gap of the one or more measurement gaps. In some configurations, the configuration information for the one or more measurement gaps may indicate one or more parameters associated with the one or more measurement gaps. In one configuration, the UE information may indicate whether the UE (apparatus 1302/1302') is measuring a current serving cell or the UE is attempting to detect another cell.

In some configurations, the apparatus may further comprise means for generating a measurement gap configuration request indicating a measurement gap configuration, where the one or more measurement gaps may be configured based on the measurement gap configuration. In one configuration, the measurement gap configuration may include at least one of a measurement gap duration, or at least one beam identifier for a measurement. In one configuration, the measurement gap configuration request may be generated based on past measurements, the past measurements indicating a mobility state of the UE. In one such configuration, the measurement gap configuration may comprise a short measurement gap duration when the mobility state indicates that the UE is stationary, and a long measurement gap duration when the mobility state indicates that the UE is mobile.

In some configurations, the apparatus may comprise means for determining that a high priority application is used in communication between the base station and the UE. In one such configuration, the measurement gap configuration request may comprise a request for UL resources for UL transmission corresponding to the high priority application during each measurement gap.

In some configurations, the apparatus may further comprise means for determining whether the measuring of the one or more reference signals is completed before expiration of a measurement gap duration of the at least one measurement gap. In some such configurations, the apparatus may further comprise means for controlling the apparatus to perform at least one of: enter into a sleep mode for a remaining portion of the measurement gap duration, notify the base station that the measuring of the one or more reference signals is completed, or monitor for a downlink control channel signal during the remaining portion of the measurement gap duration.

In some configurations, the means for receiving may be further configured to receive a downlink control channel signal during a measurement gap. In one such configuration, the means for transmitting may be further configured to transmit, to the base station, a measurement completion indication in response to the downlink control channel signal when a measurement is complete before the measurement gap expires.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
obtaining user equipment (UE) information of a UE;
configuring one or more parameters of one or more measurement gaps based on the UE information including setting a measurement gap duration of at least one of the one or more measurement gaps to a short duration when the UE information indicates that the UE is measuring a current serving cell and setting the measurement gap duration of the at least one of the one or more measurement gaps to a long duration when the UE information indicates that the UE is attempting to detect another cell; and
transmitting, to the UE, a measurement request including measurement gap information on the one or more measurement gaps.

2. The method of claim 1, wherein the configuring the one or more parameters of the one or more measurement gaps further comprises:
configuring a frequency of occurrence of the at least one of the one or more measurement gaps having a long duration to a first occurrence frequency; and
configuring a frequency of occurrence of the at least one of the one or more measurement gaps having a short duration to a second occurrence frequency,
wherein the first occurrence frequency is less than the second occurrence frequency, and
wherein the measurement gap information includes information indicating at least one of the first frequency of occurrence or the second frequency of occurrence.

3. The method of claim 1, wherein the configuring the one or more parameters of the one or more measurement gaps comprises:
determining a mobility state of the UE based on the UE information, the UE information including at least one of uplink reference signal, or feedback information from the UE;
setting a measurement gap duration of at least one of the one or more measurement gaps to a short duration and a frequency of occurrence of the at least one of the one or more measurement gaps to be high when the mobility state of the UE indicates that the UE is stationary; and
setting the measurement gap duration of the at least one of the one or more measurement gaps to a long duration and a frequency of occurrence of the at least one of the one or more measurement gaps to be high when the mobility state indicates that the UE is mobile.

4. The method of claim 1, wherein the configuring the one or more parameters of the one or more measurement gaps comprises:
determining that a high priority application is used in communication between the base station and the UE based on the UE information; and
configuring uplink resources during each measurement gap of the one or more measurement gaps to enable the UE to perform uplink communication during the one or more measurement gaps using the uplink resources.

5. The method of claim 4, wherein the high priority application includes a low-latency application or a mission-critical application.

6. The method of claim 1, further comprising:
transmitting a downlink control channel signal during a measurement gap;
monitoring for a measurement completion indication in response to the downlink control channel signal; and
determining that the UE has completed a measurement before the measurement gap expires when the measurement completion indication is received.

7. The method of claim 6, further comprising:
allocating at least one of an uplink grant or a resource for a reference signal transmission to receive the measurement completion indication from the UE.

8. The method of claim 1, wherein the UE information includes a requested measurement gap pattern,
wherein the one or more measurement gaps are configured based on the requested measurement gap pattern.

9. The method of claim 1, wherein the configuring the one or more parameters of the one or more measurement gaps comprises:
setting a time interval between each of the one or more measurement gaps.

10. A base station for wireless communication, comprising:
a memory; and
at least one processor coupled to the memory and configured to:
obtain user equipment (UE) information of a UE;
configure one or more parameters of one or more measurement gaps based on the UE information;
set a measurement gap duration of at least one of the one or more measurement gaps to a short duration when the UE information indicates that the UE is measuring a current serving cell;
set the measurement gap duration of the at least one of the one or more measurement gaps to a long duration when the UE information indicates that the UE is attempting to detect another cell
and
transmit, to the UE, a measurement request including measurement gap information on the one or more measurement gaps.

11. The base station of claim 10, wherein as part configuring the one or more parameters of the one or more measurement gaps, the at least one processor is further configured to:
determine a mobility state of the UE based on the UE information, the UE information including at least one of uplink reference signal, or feedback information from the UE;
set a measurement gap duration of at least one of the one or more measurement gaps to a short duration and a frequency of occurrence of the at least one of the one or more measurement gaps to be high when the mobility state of the UE indicates that the UE is stationary; and
set the measurement gap duration of the at least one of the one or more measurement gaps to a long duration and a frequency of occurrence of the at least one of the one or more measurement gaps to be high when the mobility state indicates that the UE is mobile.

12. The base station of claim 10, wherein as part configuring the one or more parameters of the one or more measurement gaps, the at least one processor is further configured to:
determine that a high priority application is used in communication between the base station and the UE based on the UE information; and configure uplink resources during each measurement gap of the one or more measurement gaps to enable the UE to perform uplink communication during the one or more measurement gaps using the uplink resources.

13. The base station of claim 10, wherein the at least one processor is further configured to:
transmit a downlink control channel signal during a measurement gap;
monitor for a measurement completion indication in response to the downlink control channel signal; and
determine that the UE has completed a measurement before the measurement gap expires when the measurement completion indication is received.

\* \* \* \* \*